(12) United States Patent
Gentile et al.

(10) Patent No.: US 8,824,861 B2
(45) Date of Patent: Sep. 2, 2014

(54) INTERACTIVE SYSTEMS AND METHODS FOR VIDEO COMPOSITING

(75) Inventors: Anthony Gentile, New York, NY (US); John Gentile, Montclair, NJ (US); Scott Wilker, Glen Rock, NJ (US); Mark Waldrep, Los Angeles, CA (US); Matthew Veenstra, Alameda, CA (US)

(73) Assignee: Yoostar Entertainment Group, Inc., New York, NY (US)

(*) Notice: Subject to any disclaimer, the term of this patent is extended or adjusted under 35 U.S.C. 154(b) by 740 days.

(21) Appl. No.: 12/495,517

(22) Filed: Jun. 30, 2009

(65) Prior Publication Data

US 2010/0027961 A1 Feb. 4, 2010

Related U.S. Application Data

(60) Provisional application No. 61/077,363, filed on Jul. 1, 2008, provisional application No. 61/144,383, filed on Jan. 13, 2009.

(51) Int. Cl.
*H04N 5/93* (2006.01)
*H04N 5/262* (2006.01)
*G06T 5/50* (2006.01)
*G11B 27/034* (2006.01)
*H04N 5/91* (2006.01)
*H04N 5/272* (2006.01)
*G11B 27/34* (2006.01)
*G11B 27/32* (2006.01)

(52) U.S. Cl.
CPC .................. *H04N 5/91* (2013.01); *H04N 5/262* (2013.01); *G06T 5/50* (2013.01); *G11B 27/034* (2013.01); *H04N 5/272* (2013.01); *G11B 27/34* (2013.01); *G11B 27/322* (2013.01)
USPC .......................................................... 386/278

(58) Field of Classification Search
USPC ......... 386/210, 248, 287, 239, 240, 278, 280, 386/282, 285, 286; 348/592
See application file for complete search history.

(56) References Cited

U.S. PATENT DOCUMENTS

| 4,122,490 A | 10/1978 | Lish |
| 4,357,624 A | 11/1982 | Greenberg |

(Continued)

FOREIGN PATENT DOCUMENTS

| EP | 0 867 839 A2 | 9/1998 |
| EP | 2124438 A1 | 11/2009 |

(Continued)

OTHER PUBLICATIONS

A.J. Schofield et al.; "A System for Counting People in Video Images using Neural Networks to Identify the Background Scene"; Pattern Recognition; vol. 29, No. 8, pp. 1421-1428; Elsevier Science Ltd. Great Britain; 1996.

(Continued)

*Primary Examiner* — Tat Chio
(74) *Attorney, Agent, or Firm* — Fitzpatrick, Cella, Harper & Scinto

(57) ABSTRACT

Certain interactive role performance systems and methods are disclosed that allow users to select a role to play in a prerecorded video, such as a movie scene, and to replace an original actor of that role with the user's performance. In certain examples, the user selects a prerecorded scene from which a character has been removed and records his or her performance. The interactive role performance system can insert the user's performance in place of the original character, thereby creating the appearance that the user is interacting, such as in real-time, with the other characters in the movie scene. Moreover, systems and methods can further utilize background subtraction techniques to isolate the user image. In further examples, the recorded user performance is stored separately from the prerecorded video.

34 Claims, 21 Drawing Sheets

(56) References Cited

U.S. PATENT DOCUMENTS

| | | |
|---|---|---|
| 4,521,014 A | 6/1985 | Sitrick |
| 4,599,611 A | 7/1986 | Bowker et al. |
| 4,688,105 A | 8/1987 | Bloch et al. |
| 4,710,873 A | 12/1987 | Breslow et al. |
| 4,800,432 A | 1/1989 | Barnett et al. |
| 4,827,344 A | 5/1989 | Astle et al. |
| 4,891,748 A | 1/1990 | Mann |
| 4,968,132 A | 11/1990 | Ferren |
| 5,099,337 A | 3/1992 | Cury |
| 5,144,454 A | 9/1992 | Cury |
| 5,151,793 A | 9/1992 | Ito et al. |
| 5,184,295 A | 2/1993 | Mann |
| 5,249,967 A | 10/1993 | O'Leary et al. |
| 5,264,933 A | 11/1993 | Rosser et al. |
| 5,381,184 A | 1/1995 | Gehrmann |
| 5,428,401 A | 6/1995 | Hinson |
| 5,500,684 A | 3/1996 | Uya |
| 5,553,864 A | 9/1996 | Sitrick |
| 5,566,251 A | 10/1996 | Hanna et al. |
| 5,681,223 A | 10/1997 | Weinreich |
| 5,751,337 A | 5/1998 | Allen et al. |
| 5,764,306 A | 6/1998 | Steffano |
| 5,830,065 A | 11/1998 | Sitrick |
| 5,861,881 A | 1/1999 | Freeman et al. |
| 5,953,076 A | 9/1999 | Astle et al. |
| 5,982,350 A | 11/1999 | Hekmatpour et al. |
| 6,061,532 A | 5/2000 | Bell |
| 6,072,537 A | 6/2000 | Gurner et al. |
| 6,072,933 A | 6/2000 | Green |
| 6,086,380 A | 7/2000 | Chu et al. |
| 6,122,013 A | 9/2000 | Tamir et al. |
| 6,126,449 A | 10/2000 | Burns |
| 6,198,503 B1 | 3/2001 | Weinreich |
| 6,283,858 B1 | 9/2001 | Hayes, Jr. et al. |
| 6,285,408 B1 | 9/2001 | Choi et al. |
| 6,335,765 B1 | 1/2002 | Daly et al. |
| 6,350,199 B1 | 2/2002 | Williams et al. |
| 6,351,265 B1 | 2/2002 | Bulman |
| 6,384,821 B1 | 5/2002 | Borrel et al. |
| 6,425,825 B1 | 7/2002 | Sitrick |
| 6,476,874 B1 | 11/2002 | Ito et al. |
| 6,522,787 B1 | 2/2003 | Kumar et al. |
| 6,535,269 B2 | 3/2003 | Sherman et al. |
| 6,624,853 B1 | 9/2003 | Latypov |
| 6,750,919 B1 | 6/2004 | Rosser |
| 6,816,159 B2 | 11/2004 | Solazzi |
| 6,835,887 B2 | 12/2004 | Devecka |
| 6,881,067 B2 | 4/2005 | Tarry |
| 6,919,892 B1 | 7/2005 | Cheiky et al. |
| 6,937,295 B2 | 8/2005 | Islam et al. |
| 6,954,498 B1 | 10/2005 | Lipton |
| 7,015,978 B2 | 3/2006 | Jeffers et al. |
| 7,027,054 B1 | 4/2006 | Cheiky et al. |
| 7,034,833 B2 | 4/2006 | Epshteyn |
| 7,079,176 B1 | 7/2006 | Freeman et al. |
| 7,106,906 B2 | 9/2006 | Iwamura |
| 7,137,892 B2 | 11/2006 | Sitrick |
| 7,181,081 B2 | 2/2007 | Sandrew |
| 7,209,181 B2 | 4/2007 | Kriegman |
| 7,221,395 B2 | 5/2007 | Kinjo |
| 7,230,653 B1 | 6/2007 | Overton et al. |
| 7,268,834 B2 | 9/2007 | Lundberg et al. |
| 7,285,047 B2 | 10/2007 | Gelb et al. |
| 7,319,493 B2 | 1/2008 | Hata et al. |
| 7,324,166 B1 | 1/2008 | Joslin et al. |
| 7,400,752 B2 | 7/2008 | Zacharias |
| 7,495,689 B2 | 2/2009 | Curtis et al. |
| 7,528,890 B2 * | 5/2009 | Staker et al. ............... 348/592 |
| 7,559,841 B2 | 7/2009 | Hashimoto |
| 7,613,350 B2 | 11/2009 | Iwamura |
| 7,616,264 B1 | 11/2009 | Greenberg |
| 7,626,617 B2 | 12/2009 | Terada |
| 7,646,434 B2 | 1/2010 | Staker et al. |
| 7,649,571 B2 | 1/2010 | Staker et al. |
| 7,675,520 B2 * | 3/2010 | Gee et al. ............... 345/473 |
| 7,716,604 B2 | 5/2010 | Kataoka et al. |
| 7,720,283 B2 | 5/2010 | Sun et al. |
| 7,752,648 B2 | 7/2010 | Shelton et al. |
| 7,780,450 B2 | 8/2010 | Tarry |
| 2002/0007718 A1 | 1/2002 | Corset |
| 2002/0130889 A1 | 9/2002 | Blythe et al. |
| 2003/0051255 A1 | 3/2003 | Bulman et al. |
| 2003/0108329 A1 | 6/2003 | Adriansen et al. |
| 2003/0148811 A1 | 8/2003 | Sitrick |
| 2004/0100581 A1 | 5/2004 | Williams |
| 2004/0152058 A1 | 8/2004 | Browne et al. |
| 2004/0202382 A1* | 10/2004 | Pilu ............... 382/276 |
| 2005/0028193 A1 | 2/2005 | Candelore et al. |
| 2005/0151743 A1 | 7/2005 | Sitrick |
| 2005/0215319 A1 | 9/2005 | Rigopulos et al. |
| 2006/0136979 A1 | 6/2006 | Staker et al. |
| 2006/0262696 A1 | 11/2006 | Woerlee |
| 2007/0064120 A1 | 3/2007 | Didow et al. |
| 2007/0064125 A1 | 3/2007 | Didow et al. |
| 2007/0064126 A1 | 3/2007 | Didow et al. |
| 2007/0107015 A1 | 5/2007 | Kazama et al. |
| 2007/0122786 A1 | 5/2007 | Relan et al. |
| 2007/0189737 A1 | 8/2007 | Chaudhri et al. |
| 2008/0085766 A1 | 4/2008 | Sitrick |
| 2009/0015679 A1* | 1/2009 | Hayakawa et al. ......... 348/207.1 |
| 2009/0040385 A1 | 2/2009 | Staker et al. |
| 2009/0041422 A1 | 2/2009 | Staker et al. |
| 2009/0059094 A1 | 3/2009 | Yi et al. |
| 2009/0163262 A1* | 6/2009 | Kang ............... 463/8 |
| 2009/0195638 A1 | 8/2009 | Caspi et al. |
| 2009/0199078 A1 | 8/2009 | Caspi et al. |
| 2009/0202114 A1 | 8/2009 | Morin et al. |
| 2009/0208181 A1 | 8/2009 | Cottrell |
| 2009/0237564 A1 | 9/2009 | Kikinis et al. |
| 2009/0271821 A1 | 10/2009 | Zalewski |
| 2009/0280897 A1 | 11/2009 | Fitzmaurice et al. |
| 2009/0324191 A1 | 12/2009 | Reusens et al. |
| 2010/0027961 A1 | 2/2010 | Gentile et al. |
| 2010/0031149 A1 | 2/2010 | Gentile et al. |
| 2010/0171848 A1 | 7/2010 | Peters et al. |

FOREIGN PATENT DOCUMENTS

| | | |
|---|---|---|
| JP | 60-190078 | 9/1985 |
| JP | 63-178677 | 7/1988 |
| JP | 1-228288 | 9/1989 |
| JP | 2-127886 | 5/1990 |
| JP | 3-261279 | 11/1991 |
| JP | 4-220885 | 8/1992 |
| JP | 05-014810 | 1/1993 |
| JP | 5-284522 | 10/1993 |
| JP | 09-219836 | 8/1997 |
| JP | 11-069228 | 3/1999 |
| JP | 11252459 | 9/1999 |
| JP | 2000-209500 | 7/2000 |
| JP | 2002-077726 | 3/2002 |
| JP | 2002-232783 | 8/2002 |
| JP | 2002-281465 | 9/2002 |
| JP | 2004-501576 | 1/2004 |
| WO | WO 93/06691 | 4/1993 |
| WO | WO 99/26160 | 5/1999 |
| WO | WO 01/63560 | 8/2001 |
| WO | WO 01/99413 | 12/2001 |
| WO | WO 02/071763 A1 | 9/2002 |
| WO | WO 2004/040576 A1 | 5/2004 |
| WO | WO 2005/076618 A1 | 8/2005 |
| WO | WO 2006/135358 | 12/2006 |
| WO | WO 2007035558 A2 * | 3/2007 |
| WO | WO 2007/071954 A1 | 6/2007 |
| WO | WO 2009/079560 A1 | 6/2009 |

OTHER PUBLICATIONS

Franco Caroti Ghelli; "A Sequential Learning Method for Boundary Detection," Pattern Recognition; vol. 21, No. 2, pp. 131-139; Great Britain; 1988.

G.Y. Georgiannakis et al.; "Design of an Immersive Teleconferencing Application"; Institute of Computer Science, FORTH and Depart-

(56) References Cited

OTHER PUBLICATIONS ment of Computer Science, University of Crete; Dated: 1996; 14 pages.
Nikhil R. Pal et al.; "A Review on Image Segmentation Techniques"; Pattern Recognition; vol. 26, No. 9, pp. 1277-1294; Great Britain; 1993.
PCT International Search Report and Written Opinion, Application No. PCT/US2009/049303, mailed Dec. 7, 2009, 22 pages.

R. Braham; "The Digital Backlot"; IEEE Spectrum, vol. 32; Issue 7; pp. 51-63; Jul. 1995.
S. Alliney et al.; "On Registration of an Object Translating on a Static Background"; Pattern Recognition; vol. 29, No. 1, pp. 131-141; Elsevier Science Ltd. Great Britain; 1996.
Til Aach et al.; "Disparity-Based Segmentation of Stereoscopic Foreground/Background Image Sequences"; IEEE Transactions on Communications; vol. 42, No. 2/3/4; pp. 673-679; 1994.

\* cited by examiner

INTERACTIVE SYSTEMS AND METHODS FOR VIDEO COMPOSITING

RELATED APPLICATIONS

This application claims the benefit of priority under 35 U.S.C. §119(e) of U.S. Provisional Patent Application No. 61/077,363, filed Jul. 1, 2008, and entitled "Interactive Systems and Methods for Video Compositing," and U.S. Provisional Patent Application No. 61/144,383, filed Jan. 13, 2009, and entitled "Interactive Systems and Methods for Video Compositing," the entirety of each of which is hereby incorporated herein by reference to be considered part of this specification.

The present application is also related to the following applications filed on even date herewith, each of which is hereby incorporated herein by reference in its entirety to be considered part of this specification: U.S. patent application Ser. No. 12/495,548, entitled "CONTENT PREPARATION SYSTEMS AND METHODS FOR INTERACTIVE VIDEO SYSTEMS"; and U.S. patent application Ser. No. 12/495,590, entitled "USER INTERFACE SYSTEMS AND METHODS FOR INTERACTIVE VIDEO SYSTEMS".

BACKGROUND

1. Field

Embodiments of the invention generally relate to interactive systems and methods for performing video compositing in an entertainment environment.

2. Description of the Related Art

Interactive entertainment is a popular leisure activity for people across the globe. One favorite activity for many is karaoke, which temporarily turns lay persons into "stars" as they sing the lyrics to a favorite song. Karaoke machines play the music of a selected song while simultaneously displaying the song lyrics to a user.

Another favorite leisure activity for millions is watching movies. Billions of dollars are spent each year on movie purchases and rentals for home use. Home movie watching, however, has predominantly been a passive activity, wherein there is little if any viewer interaction. Furthermore, although one may watch the same movie repeatedly, each time the same characters appear and recite the same lines and perform the same actions.

SUMMARY

In view of the foregoing, a need exists for interactive systems and methods for video compositing allowing a more seamless integration with existing video scenes. Moreover, there is a need for systems and methods that can provide a real-time output of a combined video. Further, there is a need for systems and methods that users can operate with little skill or experience. Finally, there is a need for systems and methods that can generate media content, such as content wherein a character has been removed, for interactive role performance systems.

In certain embodiments, an interactive role performance system allows users to select a role to play in a movie scene and replace the original actor of that role with their own performance. Using the interactive role performance system, if a participant wants to reenact scenes from a favorite movie, the participant can select a scene from that movie, record his or her own performance, and the system inserts that performance in place of the original character, creating the appearance that the participant is interacting with the other characters in the movie scene. For example, if a participant wants to reenact a scene from STAR WARS, he can record his own performance as LUKE SKYWALKER and that performance is combined into the scene in place of the actor's (e.g., Mark Hamill) performance.

In some embodiments, a content preparation system is used to generate the scenes used by the interactive role performance system. Original media content from a variety of sources, such as movies, television, and commercials, can be used to provide participants with a wide variety of scenes and roles. The content preparation system takes an original media content, removes a character from the content, and recreates the background. By recreating the background after removing the character, the user is given greater freedom to perform as the user can perform anywhere within the scene. For example, a scene from STAR WARS is generated by removing the LUKE SKYWALKER character from the scene, and recreating the background behind LUKE SKYWALKER, leaving a clear, recreated background where the participant's performance can be inserted.

In certain embodiments, a method is disclosed for combining video images in an interactive video system. The method comprises receiving a first video signal associated with prerecorded video content having multiple frames and receiving metadata associated with the first video signal, the metadata being indicative of selected ones of the multiple frames in which an original character of the prerecorded video content has been removed prior to receiving the first video signal. The method further includes receiving a second video signal comprising second video content having a background image and a video image of a participant playing a role of the original character in front of the background image and filtering the second video signal to remove the background image to create a modified second video signal with the video image of the participant. The method also includes combining the first video signal and the modified second video signal to create combined video content, the combining comprising selectively inserting the video image of the participant in the selected ones of the multiple frames such that the participant appears in place of the original character by overlaying the modified second video signal on the first video signal such that placement of the video image of the participant is unrestricted within each of the selected ones of the multiple frames.

In some embodiments, a system is disclosed for interactive video entertainment. The system comprises a first database comprising prerecorded video content having multiple frames and metadata associated with the prerecorded video content, the metadata identifying selected ones of the multiple frames in which an original character of the prerecorded video content has been removed. The system further comprises a video input configured to receive a real-time video signal comprising a video image of a participant and a background image and a processing module configured to execute on a computing device. The processing module is further configured to filter the real-time video signal to remove the background image to create a modified real-time video signal, and combine, based at least on the metadata, the prerecorded video content and the modified real-time video signal to selectively insert the video image of the participant in the selected ones of the multiple frames such that the video image of the participant appears in place of the original character and such that the video image of the participant can appear anywhere within each of the selected ones of the multiple frames.

In certain embodiments, a system is disclosed for combining video images. The system comprises: means for identifying selected ones of multiple frames of prerecorded video content in which an original character has been removed from the prerecorded video content; means for receiving a second video signal comprising a video image of a participant and a background image; means for filtering the second video signal to remove the background image and to create a modified second video signal; and means for combining, based at least on the identifying means, the prerecorded video content and the modified second video signal to selectively insert the video image of the participant in the selected ones of the multiple frames such that the video image of the participant appears in place of the original character, wherein the combining further comprises overlaying the modified second video signal on the prerecorded video content such that placement of the video image of the participant is unrestricted within each of the selected ones of the multiple frames.

Furthermore, in certain embodiments, the systems and methods summarized above can advantageously be implemented using computer software. In one embodiment, the system is implemented as a number of software modules that comprise computer executable code for performing the functions described herein. However, a skilled artisan will appreciate that any module that can be implemented using software to be executed on a general purpose computer can also be implemented using a different combination of hardware, software, and/or firmware.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

The drawings, associated descriptions, and specific implementations are provided to illustrate embodiments of the invention and not to limit the scope of the disclosure. In addition, methods and functions described herein are not limited to any particular sequence, and the blocks or states relating thereto can be performed in other sequences that are appropriate. For example, described blocks or states may be performed in an order other than that specifically disclosed, or multiple blocks or states may be combined in a single block or state.

DETAILED DESCRIPTION OF THE PREFERRED EMBODIMENTS

Figure 1:
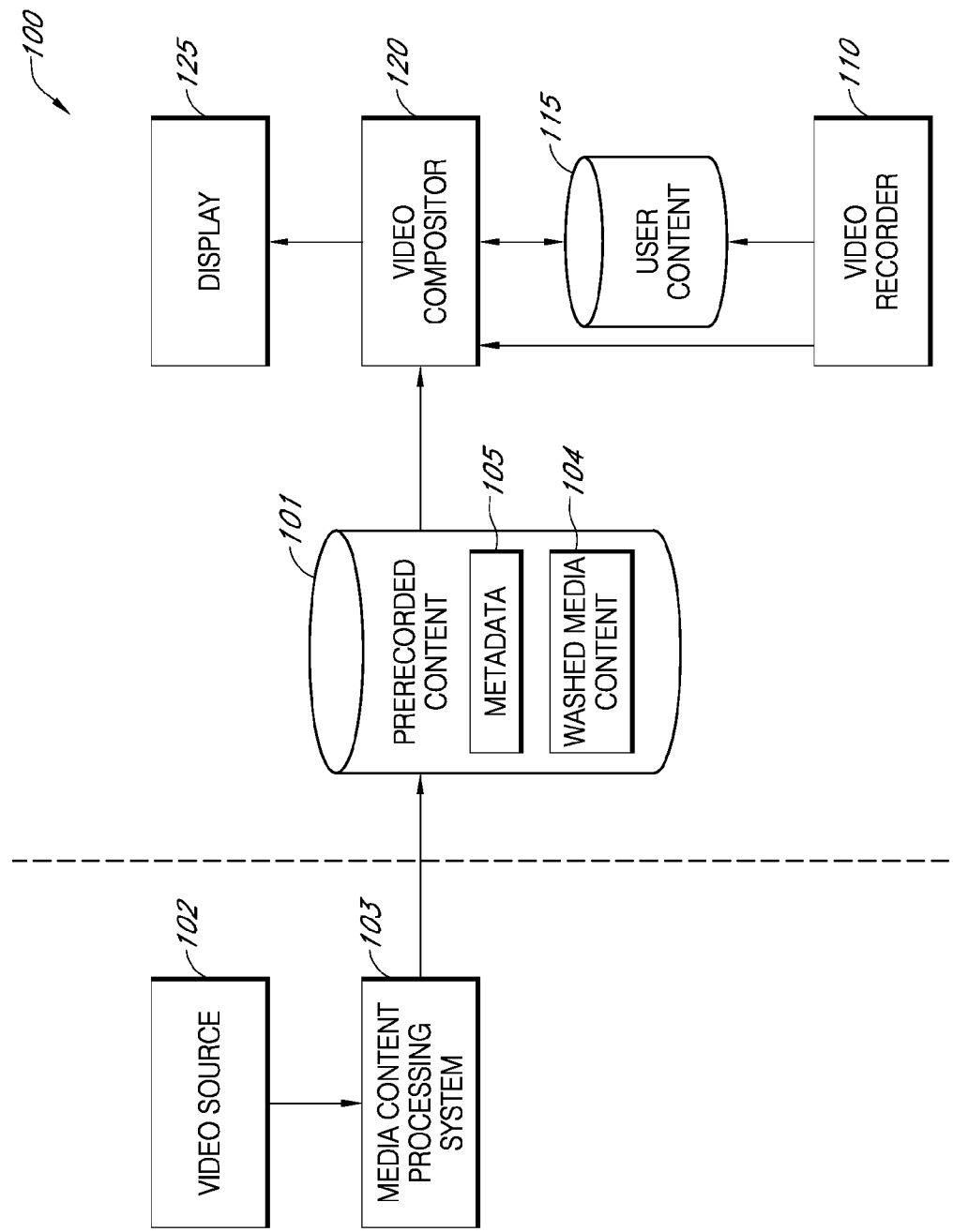
FIG. 1 illustrates an exemplary embodiment of an interactive role performance system according to certain embodiments of the invention.

Certain interactive role performance systems and methods are disclosed herein that allow users to select a role to play in a movie scene and replace an original actor of that role with their own performance. In certain embodiments, if a participant wants to reenact scenes from a favorite movie, the participant can select a scene from that movie, record his or her own performance, and the interactive role performance system inserts that performance in place of the original character, creating the appearance that the participant is interacting with the other characters in the movie scene.

In some embodiments, content preparation systems and methods are provided that generate the scenes used by the interactive role performance system. Original media content from a variety of sources, such as movies, television, and commercials, can be used to provide participants with a wide variety of scenes and roles. In some embodiments, the content preparation system takes original media content, removes a character from the content, and recreates the background. By recreating the background after removing the character, the participant is given greater freedom to perform as the user can perform anywhere within the scene.

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the invention and not to limit the scope of the disclosure.

For purposes of illustration, some embodiments will be described in the context of video formats and movie scenes.

However, the present disclosure is not limited by the source of the media content, and other media content sources may be used, such as, for example, video games, animation, sports clips, newscasts, music videos, commercials, television, documentaries, combinations of the same or the like. Neither is the present disclosure limited by the format of the media content, and other formats may be used, such as, for example, still images, computer generated graphics, posters, music, three-dimensional (3D) images, holograms, combinations of the above or the like. It is also recognized that in other embodiments, the systems and methods may be implemented as a single module and/or implemented in conjunction with a variety of other modules and the like. Moreover, the specific implementations described herein are set forth in order to illustrate, and not to limit, the invention.

Conditional language, such as, among others, "can," "could," "might," or "may," unless specifically stated otherwise, or otherwise understood within the context as used, is generally intended to convey that some embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The terms "actor" or "character" as used herein are broad terms and are used in their ordinary sense and include, without limitation, any replaceable element in a media content, such as still or video content. For example, an "actor" or "character" can be a person (live or animated), an animal, an avatar, a computer-generated character, a game character, a cartoon character, and/or a thing.

The terms "video," "scene," "clip," "image," and "content" are broad terms and are used in their ordinary sense and include, without limitation, any type of media content. For example, media content can include pictures, videos, film, television, documentaries, commercials, sports, music, music videos, games, posters, original content, user-generated content, licensed content, royalty free content, any pre-existing moving image or graphic content, still images, digital avatars, online content, combinations of the above, or the like. The media content may or may not include audio, dialogue, and/or effects. The media content can be in English or any other language.

The term "compositing" as used herein is a broad term and is used in its ordinary sense and includes, without limitation, the superimposing or combining of multiple signals, such as, for example, video and/or audio signals, to form a combined signal or display. Furthermore, compositing does not require two signals and/or video images to be stored as a single signal, file and/or image. Rather, "compositing" can include the simultaneous, or substantially simultaneous, playing of two or more signals (for example, video files) such that the signals are output via a single display or interface. The term "compositor" refers to any device or system, implemented in hardware, software, or firmware, or any combination thereof, that performs in whole or in part a compositing function.

The term "real time" as used herein is a broad term and is used in its ordinary sense and includes, without limitation, a state or period of time during which some event or response takes place. A real-time system or application can produce a response to a particular stimulus or input without intentional delay such that the response is generated during, or shortly thereafter, the receiving of the stimulus or input. For example, a device processing data in real time may process the data as it is received by the device.

Moreover, a real-time signal is one that is capable of being displayed, played back, or processed within a particular time after being received or captured by a particular device or system, wherein said particular time can include non-intentional delay(s). In one embodiment, this particular time is on the order of one millisecond. In other embodiments, the particular time may be more or less than one millisecond. In yet other embodiments, "real time" refers to events simulated at a speed similar to the speed at which the events would occur in real life.

The term "database" as used herein is a broad term and is used in its ordinary sense and includes without limitation any data source. A database may be implemented using a relational database, such as DB2, Sybase, Oracle, CodeBase and MICROSOFT SQL SERVER as well as other types of databases such as, for example, a flat file database, an entity-relationship database, and object-oriented database, and/or a record-based database. A database may also be one or more files stored on a storage device, such as a hard drive or optical device.

The term "metadata" as used herein is a broad term and is used in its ordinary sense and includes without limitation any information associated with a media content. For example, the information can comprise control data providing an interactive role performance system with directions on how to process the media content or the information can be descriptive information identifying the media content. The metadata can comprise in and/or out points of characters, actions in the original scene, audio levels, camera movement, switching, positions, zoom, pan, camera control signals, lighting information, color and hue information, titles, descriptions, category, tags, combinations of the same or the like. Metadata can be recorded in a text document, database, eXtensible Markup Language (XML) file, and/or embedded within the washed or customized content.

FIG. 1 illustrates an exemplary embodiment of an interactive role performance system 100 according to certain embodiments of the invention. In certain embodiments, the interactive role performance system 100 is configured to selectively insert an image of one or more users into prerecorded media, such as a movie. In some embodiments, the image of the one or more users are recorded and/or inserted in real time.

Referring to FIG. 1, the prerecorded content database 101 stores "washed" media content 104, or content wherein an actor or character has been removed for replacement, and/or metadata 105. During content development, a video source 102 receives, processes, and/or stores media content received from a studio, comprising the source media files. A media content processing system 103 prepares or "washes" media content clips of actors and/or objects and creates corresponding metadata 105 for the washed media content 104. The completed washed content 104 is then sent to the prerecorded content database 101.

From the content database 101, the washed media content 104 is available for use in the video composting process. The video recorder 110 captures an image and/or video of the user. The feed from the video recorder 110 is sent to the video compositor 120 and/or an optional user content database 115 for storage. The video compositor 120 accesses the washed content 104 stored on the prerecorded content database 101 and combines the washed content with the feed from the video recorder 110. The final combined output is shown on the display 125.

As illustrated, the interactive role performance system 100 comprises a prerecorded content database 101. The database 101 comprises data, video files, audio files, metadata and/or other information usable to control the video compositing process. For instance, the washed media content 104 of the database 101 can comprise one or more video clips, such as movie clips comprising video and/or audio content, usable in the background of a combined video image. In certain embodiments, the media content 104 comprises washed content, as described in more detail below, wherein a character or other object has been removed from the media content 104. In other embodiments, the media content 104 can comprise unaltered video scenes from a movie or other audiovisual work. In certain embodiments, the video content comprises a QUICKTIME file, a MPEG file, a WMA file, a WMV file, a MP4 file, a MKV file, a JPEG file, and/or the like.

The database 101 can also comprise one or more matte files, as described in more detail below, usable to overlay an inserted user image. In certain embodiments, each matte file can be associated with one or more particular background clips. In other embodiments, the matte files can be integrated with the background clips.

Referring to FIG. 1, the database 101 comprises metadata 105 usable to control the selective combination of one or more character images with the background media content 104 and/or matte files and/or to control the display of such images. For instance, such metadata 105 can comprise reference data files to control the display and/or removal of user images, subtitle information, color/hue reference information (for example, color or black and white output), information for moving matte files, resize data, movie poster-frame information for producing still-frame movie posters, combinations of the same or the like. In some embodiments, the metadata 105 comprises descriptive information associated with the video content, such as actor information, key art, studio logos, titles, combinations of the same or the like.

The database 101 comprises any type of media device(s) and/or memory capable of storing the above described information. For instance, the database 101 can comprise one or more of the following: servers, hard drives, personal computers, DVDs, optical disks, flash memory, USB storage devices, thumb drives, tapes, magnetic disks, combinations of the same or the like. Moreover, the database 101 can comprise multiple databases located remote to each other.

In certain embodiments, the interactive role performance system 100 further comprises a video source 102 and/or a media content processing system 103. These components can be used during content development to process original source content to produce washed content to be stored in the prerecorded content database. After washing the source content, some or all of the washed content can be, in certain embodiments, stored in the prerecorded content database as the washed media content 104.

In certain embodiments, the video source 102 can comprise one or more computers, workstations, servers, combinations of the same or the like for processing and/or storing original source content. Source media from studios can be acquired in a variety of formats, such as digibeta tapes, digital files, DVDs, video tapes and/or the like. Source media from the studios can be "ingested" by the video source 102 to create a copy for use in the washing process and/or formatted into an uncompressed digital file. In some embodiments, the digital files are stored on a redundant array of hard drives connected to the video source directly or through a network.

In certain embodiments, a playback machine, such as a digibeta playback deck, DVD player, video player, and/or the like may be used to play back the source media with the video source ingesting the output. In certain embodiments, the video source 102 can further comprise a "helper" video card with a Serial Digital Interface (SDI) and/or Audio Engineering Society digital audio (AES3) inputs/outputs to assist the video source 102 in processing media content. In certain embodiments, the video source stores digital files in a database. One or more hard drives can be used for storing the master source. Additionally, master files can be backed up on tape archival systems and/or stored on additional hard drives. Finished washed content can then be copied to one or more prerecorded content database 101 as media content 104 for distribution to and/or use by participants.

In certain embodiments, the media content processing system 103 processes the video source 102 digital files. The media content processing system 103 can comprise, for example, computer workstations equipped with speakers and/or headphones, video/audio editing software, timecode readers/generators, and/or house sync boxes. In some embodiments, the editing software comprises FINAL CUT PRO, PHOTOSHOP, AFTER EFFECTS, ADOBE AUDITION, SOUNDTRACK PRO, and/or the like. Operators can use the workstations and/or editing software to wash individual frames of scenes from the digital files of selected elements. Operators can further use the workstations and/or editing software to recreate the backgrounds behind the washed elements of the scenes. In some embodiments, the media content processing system 103 further comprises a database and workflow manager to check the accuracy of information, provide accessibility for production management, track financial/royalty requirements, and/or provide archival security.

Referring to FIG. 1, the interactive role performance system 100 further comprises a video recorder 110, such as, for example, a digital video camera, a web camera, a smart phone camera, combinations of the same or the like, for obtaining one or more images to be inserted into the combined video image. In certain embodiments, the video recorder 110 obtains a real-time video image of a participant that is selectively "inserted" into a scene of the media content 104 from the prerecorded content database 101 to produce a real-time, interactive video image at a display.

In certain embodiments, the video recorder 110 further comprises, or is associated with, a video content processor that modifies a video image obtained through the recorder 110. For instance, such embodiments of the video recorder 110 can be used with a green screen, a blue screen, and/or other similar chroma-key equipment to prepare the obtained video image for compositing with the media content 104.

In other embodiments, video image captured through the video recorder 110 can be digitally modified to remove certain portions of the captured image. For example, background subtraction techniques, as discussed in more detail herein, can be used to isolate a foreground element, such as an image of the user. In certain embodiments, the video recorder 100 further comprises a wired or wireless microphone, a remote control, a tripod, combinations of the same or the like. Multiple video recorders located together or remotely from each other can be used to capture multiple participants and/or multiple angles. In some embodiments, the video recorder 110 captures images in 3D and/or infrared formats.

The illustrated interactive role performance system 100 can also comprise an optional user content database 115. In certain embodiments, the user content database 115 stores video and/or audio data captured through the video recorder 110. Such data can be stored directly to the user content database 115 and/or can be further processed, as discussed herein, prior to such storage. Examples of such processing include, but are not limited to, removing, replacing, and/or enhancing video elements, such as music, vocals, score, sound effects, special effects, combinations of the same or the like. The user content database 115, in certain embodiments, allows for the repeated and/or later playing of a combined video by storing a participant's "performance." In other embodiments, the user content database 115 stores avatar or other computer-generated images of a participant or other character for use in the interactive role performance system 100.

In certain embodiments, the prerecorded content database 101 and/or the user content database 115 can communicate with other components and/or modules of the interactive role performance system 100 via a wired or wireless network such as, for example, a local area network, a wide area network, the Internet, an intranet, a fiber optic network, combinations of the same or the like.

As illustrated in FIG. 1, the interactive role performance system 100 further comprises a video compositor module 120 configured to combine video images received from the prerecorded content database 101 with video images from the video recorder 110 and/or the user content database 115. In certain embodiments, the video compositor 120 comprises at least a processor and a memory. Such memory can include, for example, SDRAM, EEPROM, flash, non-volatile memory, volatile memory, a hard drive, an optical drive, a combinations of the above or the like. In certain embodiments, the video compositor 120 further comprises a graphics processing unit (GPU).

In certain embodiments, the video compositor module 120 advantageously combines and/or cause the display of multiple video images during playback without saving such images in a combined format. For instance, the media content 104 from the prerecorded content database 101 can be combined with the user video image from the video recorder 110 and/or the user content database 115 to form a combined image without storing such content in a combined file. In other embodiments, the combined image is stored in a single file or location for later playback, comment, use and/or the like.

The video compositor module 120 is advantageously configured to cause the display 125 to output the combined video image. In certain embodiments, the display 125 can comprise a television, a monitor, a liquid crystal display (LCD), a cellular phone display, a computer display, combinations of the same or the like. In certain further embodiments, the video compositor 120 can be integrated with the display 125. Additional components can also be integrated together. For example, smart phone, PDA, or other mobile device could comprise the prerecorded content database 101, the video recorder 110 in the form of a camera, the video compositor 120 in the form of compositing software, and/or the display 125. It is understood that components can be integrated in other ways, such as a camera with a memory for prerecorded content and a processor for running compositing software.

In certain embodiments, the prerecorded content database 101, video recorder 110, user content database 115, video compositor 120, and/or display 125 are used during video compositing when a user interacts with the interactive role performance system 100. In certain embodiments, the components used during video compositing can be provided to the user separately from those components used in initially preparing and developing the prerecorded content.

In certain embodiments, the content can be delivered to the user either through a physical medium or by online delivery. For instance, in certain embodiments, a user receives the video compositing elements without a prerecorded content database 101. Instead, the prerecorded content database 101 can be available online for the video compositor 120 to access over a network and/or the Internet. In other embodiments, the user receives a prerecorded content database 101 containing a limited number of media content 104 files on a CD/DVD or other physical medium, with additional content available separately. For example, washed media content 104 can be stored on a central database from which additional content can be downloaded by the video compositor 120.

A variety of connection media may be used to link elements of the interactive role performance system 100. In some embodiments, the elements are directly connected with fiber optic channels, Ethernet, and/or the like. Elements of the interactive role performance system 100 can also be spread out in remote locations and connected through the Internet and/or a virtual private network. Elements of the interactive role performance system 100 can also be wirelessly connected with other elements. In some embodiments, elements, such as the video recorder 110, video compositor 120, and/or display 125 are connected directly with audio and/or video cables and/or through a wireless connection, such as via BLUETOOTH or other radio frequency communications.

Although the interactive compositing system 100 has been described herein with reference to video technology, it will be understood from the disclosure herein that other types of media can be used by the system 100. For instance, such media can comprise video games, animation, still pictures, posters, combinations of the same or the like.

Figure 2:
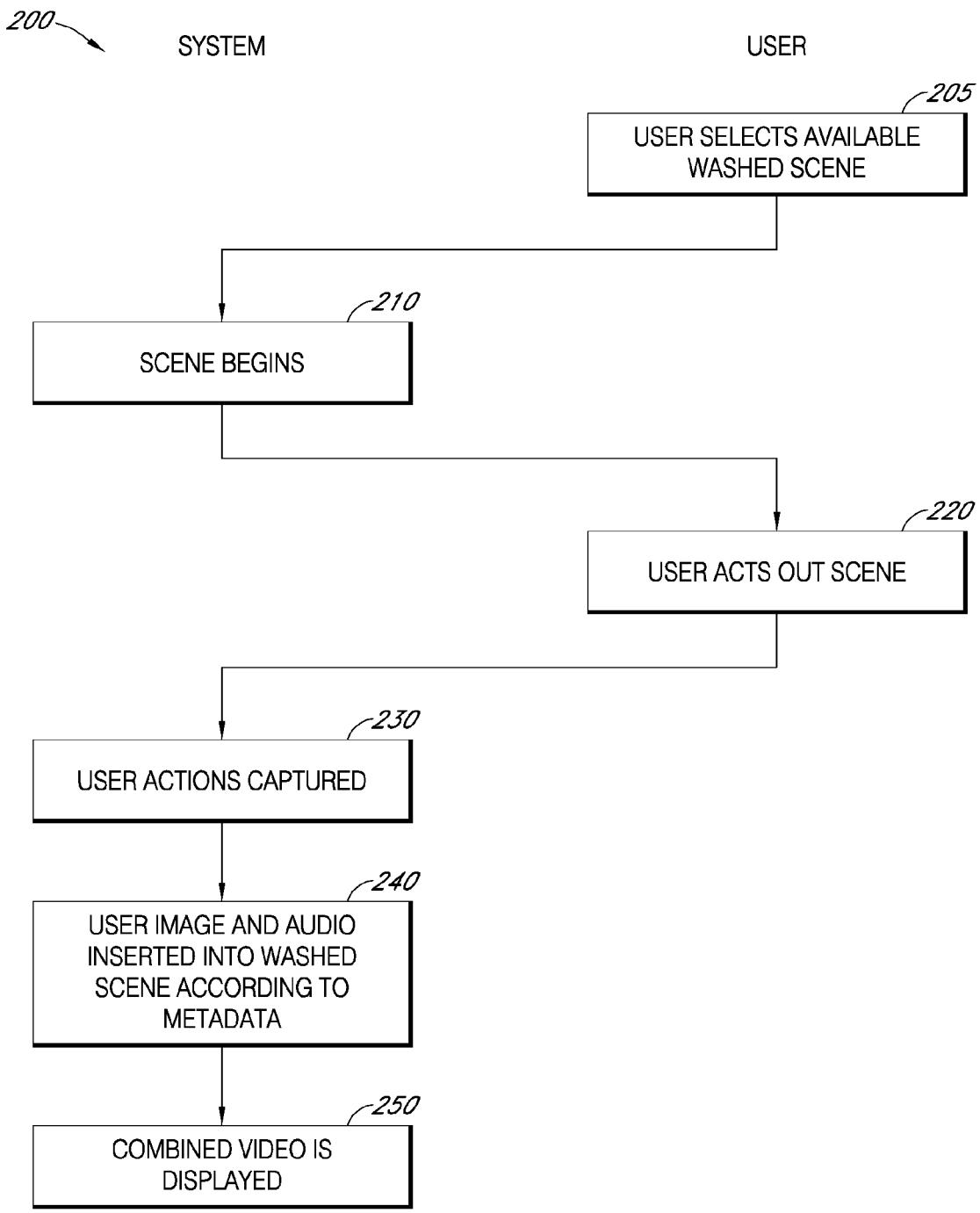
FIG. 2 illustrates a flowchart of an exemplary embodiment of a video compositing process according to certain embodiments of the invention.

FIG. 2 illustrates a flowchart of an exemplary embodiment of a video compositing process 200, according to certain embodiments of the invention. In certain embodiments, the video compositing process 200 is executed by the interactive role performance systems described herein to perform video compositing using washed content. For exemplary purposes, the video compositing process 200 is described hereinafter with reference to the components of the interactive role performance system 100 of FIG. 1.

The video compositing process 200 begins with Block 205, during which the user of the interactive role performance system 100 can select an available washed scene from the media content 104 stored on the prerecorded content database 101. In certain embodiments, the user selection is made using some form of input device, such as a remote control, a mouse, a keyboard, a touch screen, a keypad and/or the like. In certain embodiments, the video compositor 120 communicates with the prerecorded content database 101 to receive the washed media content 104. The interactive role performance system 100 can further provide the user or participant with a script of the lines or dialogue in a scene. In some embodiments, the interactive role performance system 100 further comprises a printer and provides the user with a printed script.

At Block 210, the scene selected by the user begins playing. In certain embodiments, the video compositor 120 displays the scene on the display 125 with directions, prompts or instructions to the user for properly acting out the scene. For instance, the directions can be text prompts and/or an outline on the display 125 directing the user to assume a specified stance, position himself or herself in a specified location, and/or face a specified direction. Directions can also comprise of lines of dialogue that the user repeats, visual prompts on the screen, and/or voice directions of actions to be taken, such as the directions that a real director would give to an actor.

At Block 220, the participant acts out the scene selected at Block 205. In certain embodiments, the participant follows the directional prompts given at Block 210. The directional prompts can be interactive and/or can be given out while the user is acting out the scene.

In some embodiments, a real-time feed of the participant is displayed while the participant acts out the scene. The real-time feed gives the participant feedback on what the participant's actions look like on screen. In certain embodiments, the prerecorded washed scene is combined with the real-time feed to provide the participant with real-time feedback on what the final scene will look like. In some embodiments, graphics are superimposed over the real-time feed of the user to provide clearer directions to the user. The graphics can range from text to computer-generated graphics. In some embodiments, directional prompts can consist of interactive mini-games, directing the user to punch blocks, hit balls, hula dance, hula hoop, and/or the like, wherein the participant can act out the scene based on the directional prompts.

At Block 230, the image of the participant is captured by the video recorder 110. In certain embodiments, the participant acts out the scene in front of a green screen. However, in other embodiments, screens of different colors or no screen can be used. Various techniques can also be used to isolate the image of the participant from the background. For example, chroma-key techniques can be used to separate the user from the background by the video compositor 120 and/or video recorder 110.

In some embodiments, a background processing technique is used to allow the participant to act out the scene in front of any background, with the background screen being optional. For example, the video compositor 120 can use background subtraction, where a previously recorded reference image of the background is compared to the captured video image to identify a new element in the captured image, thereby isolating the image of the user. The new element is then identified as the foreground and/or is separated out from the background for insertion into the media content 104 scene.

In certain embodiments, the user generated content captured by the video recorded 110 is stored on the user content database 115. The video recorder 110 can also record sound with the video. Moreover, in some embodiments, pre-existing sound clips are used and/or no sound is recorded.

In some embodiments, the metadata 105 associated with the washed media content 104 directs the video recorder 110 to turn on or off at certain times. The metadata 105 can be information contained in an XML file that controls the video recorder 110. For example, when the image of the participant is not currently being inserted in the scene, the video recorder 110 can be powered off or otherwise temporarily disabled to prevent extraneous sound and/or video from being recorded. In certain embodiments, the sound and the video capture can be controlled independently of each other, providing greater control over how sound and/or video is captured by the video recorder 110.

At Block 240, the image of the participant is inserted into the washed media content 104 either as a video or a still image. The video compositor 120 receives the user image from the video recorder 110 and/or from the user content database 115. Various insertion techniques can be used by the video compositor 120 to insert the participant's image into the washed scene. For example, the image of the participant can be played concurrently with and overlaid over the washed content, or the image can be incorporated into the washed content.

In some embodiments, the image insertion is unrestricted, with the image of the participant being capable of appearing anywhere within the washed scene. In certain embodiments, the metadata 105 or scene information directs the video compositor 120 on where the user image is to be inserted into the scene. This metadata 105 or scene information can further comprise display and removal points recording where a replaceable (or removed) actor appears in and/or exits the original scene corresponding to the washed scene. In some embodiments, the display and removal points comprise of the beginning and end frames of the scenes having the replaceable actor.

In certain embodiments, the metadata 105 also controls the insertion of audio, such as speech from the participant, into the washed content. In some embodiments, the washed content also contains mattes, which determine whether elements should appear in front of the inserted user image. In some embodiments, the participant is inserted as an extra or additional actor in a scene, without replacing an existing character.

In certain embodiments, the processing is offloaded to the GPU in the video compositor 120 to reduce load on a processor of the video compositor 120.

In certain embodiments, the video compositing process 200 can comprise a multi-pass processing of the media content. For example, a two-pass process can be used in which a first pass determines which pixels of the user-generated content should be designated as transparent or opaque. In particular, the elements that are to be added to or combined with the washed content 104 (e.g., the user image) are composed of opaque pixels. In certain embodiments, these pixel values are identified through background subtraction processes described in more detail herein. In a second pass, the user content is then inserted into the washed content scene.

In some embodiments, further processing can be performed that blends user-generated content more cleanly with the washed media content 104. For example, a border of several pixels around the inserted content can be blended into the washed content by applying a gradient of opaqueness to the border to create a more seamless integration with the washed content. Additional processing can be applied to the combined video to improve the image. For example, pixel sampling can be conducted to determine and correct the green levels in the image. Shadows, outlines, and/or color correction can also be applied to the combined video.

The following annotated source code illustrates one embodiment of the background subtracting program used to process the user-generated image.

```
// All values are normalized between 0.0 and 1.0.
float4 main( float2 theTextel : TEXCOORD0, float4 theColor : COLOR0 ) : COLOR0
{
    // grab the RGBA pixel color of the source and the background
    float4 aSrcColor = tex2D(srcTex, theTextel);
    float4 aBackColor = tex2D(tex1, theTextel);
    // convert the RGB values to HSV color space (hue, saturation, value)
    float3 aSrcHSV = RGBtoHSV((float3)aSrcColor);
    float3 aBackHSV = RGBtoHSV((float3)aBackColor);
    float3 aRBBDiff, aHSVDiff;
    float aMax;
    // find the difference in each RGB color channel
    aRBBDiff.r = abs(aSrcColor.r - aBackColor.r);
    aRBBDiff.g = abs(aSrcColor.g - aBackColor.g);
    aRBBDiff.b = abs(aSrcColor.b - aBackColor.b);
    // find the greatest difference of all RGB color channels
    aMax = max(max(aRBBDiff.r, aRBBDiff.g), aRBBDiff.b);
    // find the difference in each HSV color channel
    aHSVDiff[0] = abs(aSrcHSV[0] - aBackHSV[0]);
    aHSVDiff[1] = abs(aSrcHSV[1] - aBackHSV[1]);
    aHSVDiff[2] = abs(aSrcHSV[2] - aBackHSV[2]);
    // the next lines return an opaque color value for the source
pixel if it matches one of the conditional criteria below
```

```
        // determine if the hue values differs from the threshold
        if (aHSVDiff[0] > 0.075)
            return float4(aSrcColor.r, aSrcColor.g, aSrcColor.b, 1.0);
        // determine if the red values differs from the threshold
        if (aRBBDiff.r > 0.25 && aMax == aRBBDiff.r)
            return float4(aSrcColor.r, aSrcColor.g, aSrcColor.b, 1.0);
        // determine if the green values differs from the threshold
        if (aRBBDiff.g > 0.20 && aMax == aRBBDiff.g)
            return float4(aSrcColor.r, aSrcColor.g, aSrcColor.b, 1.0);
        // determine if the blue values differs from the threshold
        if (aRBBDiff.b > 0.18 && aMax == aRBBDiff.b)
            return float4(aSrcColor.r, aSrcColor.g, aSrcColor.b, 1.0);
        // if no value is determined to be opaque then set it to
        transparent. the default return float4(aSrcColor.r, aSrcColor.g,
        aSrcColor.b, 0.0);
}
```

The exemplary program disclosed above takes the inputs of two images: a source image (e.g., a video image including the user) and a reference background image (e.g., without the image of the user) to be removed from each frame of the source image. For instance, the interactive role performance system 100 can record the reference background image after the user steps out of the video recorder 110.

In certain embodiments, the program processes one pixel or textel at a time and returns a value that is fully transparent or opaque based on color channel differences between the source image and the reference background. In the described source code, the portions of the source image matching portions of the reference background are set transparent, while the portions of the source image that are different from the reference background are kept opaque. Collectively, the pixels in a frame that are opaque determine the actor and/or object that was added to the scene after the reference background image was captured.

In certain embodiments, certain established threshold values determine if a particular pixel is to be designated as opaque or not. Moreover, the threshold value can compensate for small variations in the source image and the reference background image due to inconsistencies in how the source and background images were recorded. For example, if the lighting is inconsistent during the image acquisition process, the background from the source and background reference may not be recorded identically. By using a threshold value, small differences between the backgrounds are ignored and the background of the source image is set transparent. Depending on the level of inconsistencies between the source image and the reference background, the threshold level could be set as a higher value to compensate for greater differences. In some embodiments, the threshold value can be a set value, set by the user, or adaptively set by the role performance system 100.

As described, the program further determines the RGB pixel color of the source and reference background images and then converts the RGB values to HSV color space. The program then determines the difference in each RGB and HSV color channel, wherein RGB color channels are red, green, and blue and HSV color channels are hue, saturation, and value. The program determines the greatest difference of all RGB color channels. The RGB and HSV difference is measured against the threshold value to determine if the pixel should be set as opaque. Otherwise, the pixel is set to transparent.

In certain further embodiments, an additional reference frame is taken of the participant within the background. By using a participant reference frame and the reference background image, the output quality of the background processing can be checked using the two reference frames. For example, a background subtraction process can be performed on the participant reference frame instead of the entire user content. The process outputs an isolated image of the participant which, in certain embodiments, is representative of the quality of the output from processing the entire user content. Using the participant reference frame allows the output quality of the background processing to be tested with smaller files and less processing.

In certain embodiments, video images can be processed by the video compositor 120 and/or by a remote transcoding server. For example, the combined video can be encoded by the video compositor 120 while the user content is captured. In some embodiments, user content is captured in raw format and encoded at a later time by a transcoding server located remote to the video recorder 110. After capture, the user content can be uploaded to the transcoding server. In some embodiments, the transcoding server is a virtual server running on a cluster of servers. As such, the transcoding server has significantly more processing power than the video compositor 120. The additional processing power allows the transcoding server to engage in additional processing passes over the user content and the washed content to provide a higher quality video. In some embodiments, the transcoding server transcodes the content into a flash video file, MPEG, JPEG, and/or other file type for viewing at a display 125 and/or for submission to a content sharing website. The transcoding server, in certain embodiments, can further apply a watermark to the user-generated content and/or the displayed combined content for copy control purposes.

At Block 250, the combined video is shown on the display 125. In certain embodiments, the combined video is shown in real-time with respect to the capturing of the user image by the video recorder 110. Custom filters can further be applied during playback to improve the displayed image. In some embodiments, the combined video is saved for later playback and/or displayed at a later time. The video can also be displayed remotely at a location different from the user. It is understood that the combined video is not necessarily stored in a single file. The combined video can exist as separate files that are overlaid onto each other, played back, and/or synchronized to generate a combined image. The combined video can comprise of a matte file, a subtitle file, a washed content file, and/or a user content file.

In some embodiments, the combined video or elements of the combined video, such as the user content file, are uploaded to a website for searching, sharing, and/or viewing combined video content. For example, the user content can be sent to the website and played back along with a corresponding washed content stored on the website to generate the combined video. In addition, the participant can create an introduction for the combined video using the interactive role performance system 100 using a process similar to that used to create the combined video.

The media content preparation process or "washing" process is a processing development for audio and/or video that increases the realism of the interactive experience. For example, in certain conventional compositing systems, a user playing the role of DARTH VADER in STAR WARS would be positioned precisely in front of the villain before starting the scene. During the scene, if the user were to move from side to side, the original DARTH VADER character would be visible behind the user image, detracting from the supposed realism of the experience. However, the washing processes described herein advantageously removes the original DARTH VADER character from the scene such that the participant image need not be limited to a particular area and can be freely able to move within the scene, thereby increasing the realism of the experience.

Likewise, the washing process can be applied to the audio of a scene. In certain conventional compositing systems, data files accompanying the clip supply audio switch data in real time, turning various audio tracks on or off in order to silence the replaceable character so the user can play the part uninterrupted. In one embodiment of the washing process, the character's audio is filtered out of the original audio to create a modified audio used in the washed content, allowing the participant increased freedom in the timing of his or her lines.

In certain embodiments, more content versatility is provided by disclosed systems and methods that are able to simplify the compositing process by moving more of the content processing to the content development phase, improving control over both audio and/or video manipulation, and thereby improving the "replacement" effect. For example, with video, editing software can be used to entirely remove actors from a scene, allowing the washed content to be used as the prerecorded background into which the user is inserted and simplifying the user image insertion step during the compositing process.

Figure 3:
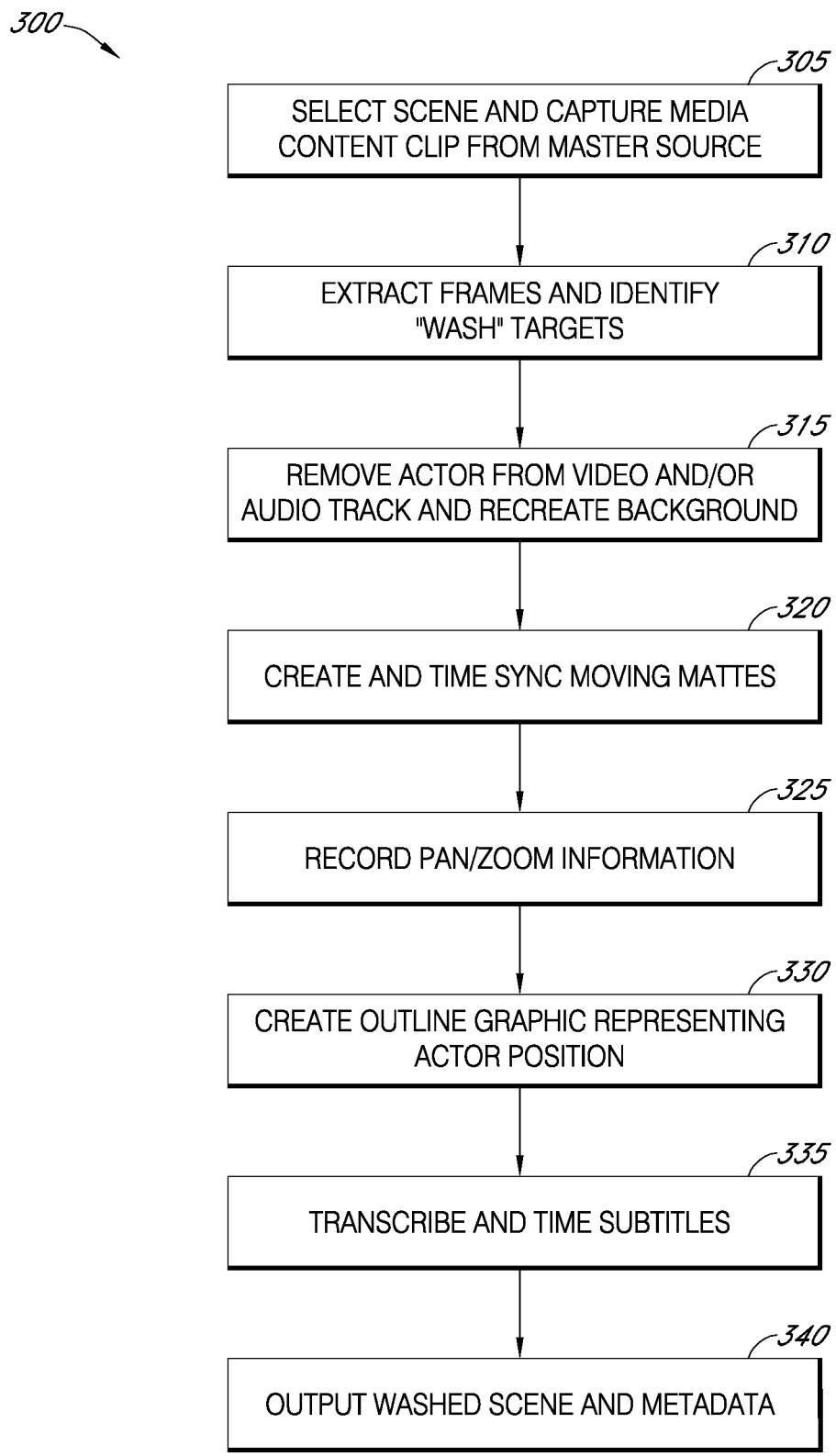
FIG. 3 illustrates a flowchart of an exemplary embodiment of a media content preparation process according to certain embodiments of the invention.

FIG. 3 illustrates a flowchart of an exemplary embodiment of a media content preparation process 300, used during content development according to certain embodiments of the invention. In certain embodiments, the process 300 is executed by embodiments of the interactive role performance systems described herein, usually by the video source 102 and/or media content processing system 103. For exemplary purposes, the media content preparation 300 is described hereinafter with reference to the components of the interactive role performance system 100 of FIG. 1.

At Block 305, a scene is selected from media content stored on the video source 102. In certain embodiments, a scene is identified by one or more watchers viewing the entire source media content to select scenes that can viably be used as washed content. For instance, the one or more watchers can log the start/end times of the scene. In some embodiments, media content is copied onto a network media server and then reviewed by one or more watchers.

In some embodiments, scenes are selected based on certain predetermined criteria and/or the ease with which the source content can be washed. Such selection criteria can comprise the duration of the scene, the visibility of the primary actor, the immobility of the background, the minimal motion of the foreground, a clear view of the actors with little or no blocking objects, and/or the consistency of the background. In certain embodiments, scenes are generally avoided if the camera is in motion, the background is in motion, there is a large amount of foreground action, there are many camera angles, scenes have lots of actions, or scenes have lots of overlapping dialogue. In some embodiments, a media content clip, comprising a selected scene, is captured from the media content. In certain embodiments, the frame selection is accomplished by a program implementing one or more selection criteria.

At Block 310, the media content processing system 103 extracts individual frames from the selected media content clip. In certain embodiments, the media content clip is exported into individual consecutive frames, such as 24 to 30 frames per second of playback. In other embodiments, clips can contain more frames or fewer frames, depending on the format of the source media content.

At Block 315, the media content processing system 103 identifies and/or selects the particular frames that contain a selected character and/or object and washes the frames through a series of manipulations to remove the selected character from the scene. In certain embodiments, such manipulations extend or continue the background image to remove the character and can comprise borrowing pixels from a background where the actor and/or object is not present, retouching the areas with consistent background materials, fabricating pixels by filing areas with appropriate artwork from within the frame or other sources and/or blending the areas into the surrounding background.

In certain embodiments, the process is repeated for every play option in each scene, breaking the clips into multiple video tracks and/or using editing software to bundle the different tracks into unique "prerecorded" background clips for each option. Within each bundle, different tracks can have unique data file triggers or metadata that correspond to different "in" and/or "out" points within the scene. For example, one set of data file triggers can determine when a user image is to be on or off the screen; another can dictate when a customized special effects layer is activated; a third can command a particular background matte layer to appear or disappear as needed.

With audio, a more robust clip development process provides an increased ability to separate audio tracks and/or isolate sound effects, musical scores, and/or the voices of different characters for individual manipulation. Media content received from the studios can contain multiple audio tracks separate from the video. For example, tracks 1 and 2 can contain mixed audio, while tracks 3 and 4 contain the music and/or effects. Certain embodiments of a the interactive role performance system 100 can either control audio data that has been delivered in separate tracks and/or mix separate tracks together, or can break audio tracks apart if the source material has them combined. Creating separate audio tracks allows for the editing of some tracks while not touching others. Certain embodiments can substitute and/or remove movie score audio, alter and/or remove actor audio, and/or enhance, alter, and/or remove sound effect data, then later recombine the tracks for association with different user play options.

For instance, certain embodiments of the invention can separate the audio tracks from STAR WARS to remove DARTH VADER'S speaking parts, replace the John Williams score with a royalty-free track, and/or enhance the light saber sound effects. When finished, the system can condense the separate tracks down to one master track to be played when the user chooses to replace DARTH VADER. A similar approach could be taken to alter different tracks for a LUKE SKYWALKER play option. The resulting experience can have better audio accompaniment because the sound elements can be better manipulated during content development than they could be on-the-fly.

At Block 320, the media content processing system 103 creates mattes from the media content. In some embodiments, compositing systems involve superimposing a new video layer, or "matte," of the user over the original background content in order to create the illusion that the user is "in" the prerecorded content. While this effect works well in many cases, certain prerecorded backgrounds contain foreground elements, such as desks, podiums, castle walls, other actors and/or the like, that appear in front of the actor to be replaced. In many cases, these foreground elements also move, such as when a bird flies across the frame, a person walks in front of the actor, and/or a camera move effectively changes the position of the stationary wall or desk relative to the actor in the frame. In order to create a more 3D interactive experience, these foreground elements can be recreated or somehow moved so as to be visible in front of the superimposed user's image.

One way for an element to appear in the foreground is by creating additional video matte layers during content development. For purposes of this disclosure, mattes can comprise, but are not limited to, video files that contain transparency information such that white space allows subordinate video layers to show through and/or black space prevents subordinate video layers from showing through. Certain mattes can be created based on elements of the target prerecorded clip such that any element which should be "in front" of the user—such as a desk—is black, and/or the elements that should be "behind" the user are white. Thus, in certain embodiments, the matte layers cause portions of a background image to come to the foreground in front of an inserted user image. In some embodiments, a moving matte is required for a motion scene. The matte creation process is described in further detail below. Once a matte is created, it can be synchronized to the media content clip to match up with the motion of the object that appears in the foreground.

In certain embodiments, the video recorder 110 captures the user image without making any camera moves, pans or zooms. These functions can be accomplished through the software of the video composition 120 system. In order to match the original scene, the original scene can be analyzed and metadata 105 can be recorded that captures the in and/or out points, actions in the original scene, audio levels, camera movement, switching, positions, zoom and/or pan. The metadata 105 can further instruct the video recorder 110 to scale, move within the x-y coordinates of the overall combined frame, and/or switch to a different angle. Metadata 105 can be recorded in a text document, database, XML file, and/or embedded within the washed content.

At Block 325, the media content processing system 103 records actor position, size information, and/or other metadata 105 associated with the washed media content 104. In some embodiments, processing software in the media content processing system 103 analyzes the media content clip to generate metadata, such as the position and size information. In certain embodiments, the actor position and/or size information are used during the setup of the camera, lights and/or green screen to determine the orientation and/or size of the inserted user in the scene. Using this information allows the inserted user image to match as closely as possible with the character that is being replaced.

At Block 330, the media content processing system 103 creates an outline graphic representing the removed character's position in the washed scene. In certain embodiments, the participant uses the outline graphic to determine where he/she should position himself/herself during recording of his/her performance of the particular scene. In some embodiments, an outline graphic is not included in the washed scene. Moreover, a user can freely move around within the scene and/or is not required to appear in a specific position.

At Block 335, the media processing system 103 transcribes and/or prepares subtitles of the dialogue for each scene or clip. In certain embodiments, subtitles appear when the removed character would be speaking and disappear when the actor is not. In some embodiments, subtitles may not be required and/or are already available and do not need to be created.

At Block 340, the media processing system 103 outputs a washed scene after completing processing the media content. In certain embodiments, the media processing system saves the washed content into a local storage device and/or saves the washed content directly to the prerecorded content database 101 as the media content 104. The washed content can further undergo a quality control process to ensure that the washed content has been properly created. The washed content may also be saved into a backup storage system. In certain embodiments, poster art for display can be created by washing actors out of media content.

Figure 4A:
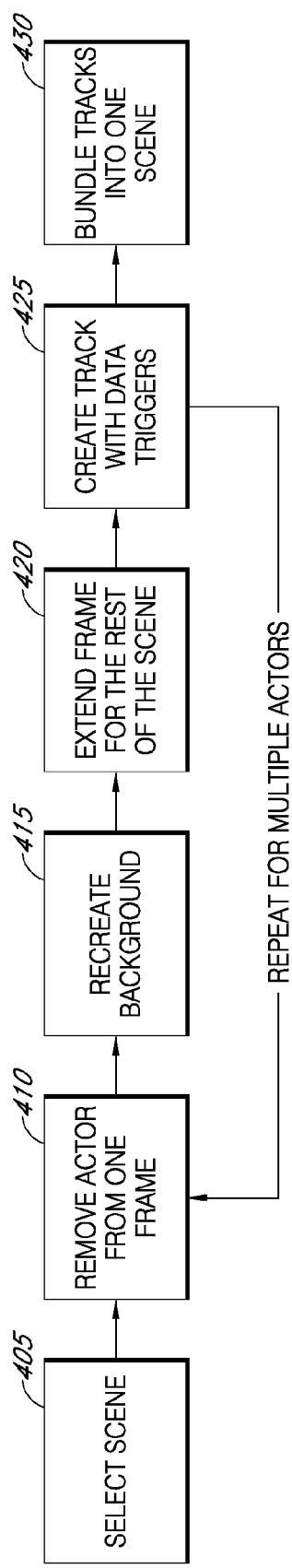
FIG. 4A-4B illustrate alternative embodiments of the media content preparation process of FIG. 3.

FIG. 4A illustrates an alternative embodiment of the media content preparation process of FIG. 3. At Block 405, a scene is selected and frames from the scene are created. At Block 410, an actor is removed from one frame. At Block 415, a background, such as a wall, is recreated behind the actor. At Block 420, the washed frame is extended or repeated for the rest of the frames in the scene. In some scenes, the background is similar from one frame to another, and reusing the washed frame saves additional effort. At Block 425, a track or file with the data triggers for the in and/or out points of the actor and/or other metadata is created. In some embodiments, the in and/or out points are represented by the first and/or last frames the actor appears in. If more than one actor is selected for removal from the scene, the process can go back to Block 410 and repeat Blocks 415, 420, and 425 for the next actor. The process can be repeated as many times as necessary for the number of actors to be washed. At Block 430, one or more tracks with the associated data triggers are bundled into a single washed media content scene.

Figure 4B:
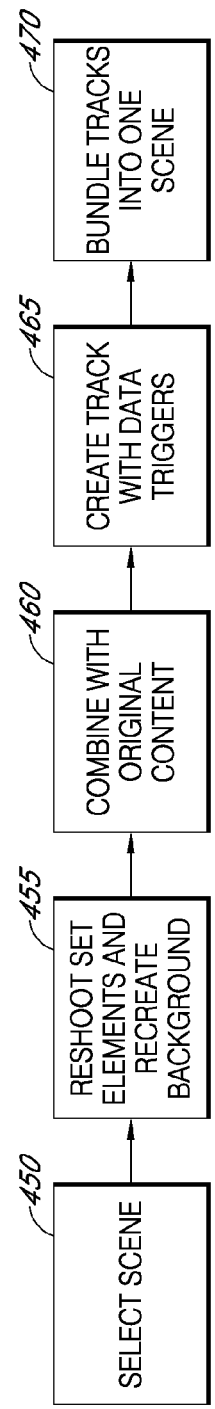

FIG. 4B illustrates another alternative embodiment of the media content preparation process of FIG. 3. At Block 450, a scene is selected and frames from the scene are created. At Block 455, elements of the set are reshot and/or a background is digitally recreated either entirely or by combining the newly shot set elements with the original content at Block 460. At Block 465, a track or file with the data triggers and/or other metadata for the scene is recorded. At Block 470, one or more tracks are bundled into one washed scene.

It will be understood that the media content preparation process can be accomplished by using any existing or new technologies that can allow for the altering of video content, such as the ability to map or track camera movements from the original content and/or recreate them with an altered background. In addition, any of the described media content preparation processes can be used singly or in combination to create the washed content.

Embodiments of the content development process also allow for customization and/or alteration of other elements affecting the interactive experience. These elements can comprise, but are not limited to, subtitle data, colors, fonts, placement, actor cues and/or suggestions, audio and/or video special effects, information about user image size, location, dynamic movement, color hue, saturation, distortion, play pattern interactivity such as voting, ranking, and/or commenting, properties for online uploading, sharing, and/or blogging, particulars about creating, sharing, printing movie stills and/or posters based on each scene, gaming elements, pitch, vocals, accuracy, volume, clapping, combinations of the same or the like.

For example, certain analysis can be performed that suggests users appearing in a scene from LORD OF THE RINGS should appear more orange than users appearing in a scene from THE MATRIX. Color saturation, lighting, hue data and/or other metadata can be written into the data files or metadata 105 for each respective scene, such that during the performance, the interactive role performance system 100 can use the data files or metadata 105 to manipulate the live image in order to more realistically blend the user into the background footage.

Likewise, digital resizing and/or movement data can be programmed into each scene that dictates where the user appears in the frame of prerecorded content, and/or the size of the user image relative to the rest of the scene. This information can be used to create dynamic effects, such as digitally simulating camera movement over the course of the scene. This data could also be written into the metadata 105 associated with the piece of washed media content 104.

In certain embodiments, the control data or metadata 105 for these elements is bundled with the associated washed media content 104 and/or matte layers during content development. These elements can be referenced and/or controlled with data files which are invisible to the user, but can be embedded in software elements and/or included in digital files (for example, an Internet downloaded file or XML file) or the like, appropriately associated with the original content purchased by the user. These improvements to the content development process can make the interactive experience more realistic, more immersive, and ultimately more enjoyable to the user.

FIGS. 5A to 5D illustrate a frame from a media content during various phases of certain embodiments of the washing process in which a single actor is washed out of the scene. For exemplary purposes, the frames, as illustrated, are described hereinafter with reference to the components of the interactive role performance system 100 of FIG. 1.

Figure 5A:
FIGS. 5A-5D illustrate a frame of media content during various phases of the content preparation process in which a single actor is washed out of the scene.

FIG. 5A illustrates a frame from a media content clip processed by the media content processing system 103. The frame depicts two actors: the first actor 505 is the target actor to be washed from the frame while the second actor 510 is retained in the frame.

Figure 5B:

FIG. 5B illustrates the frame of FIG. 5B after the actor 505 has been washed from the scene. In certain embodiments, an outline graphic 515 is added to the washed content to depict the location of the washed actor. The retained actor 510 remains unchanged in the scene. Individual washed frames comprise the complete washed content scenes 104 stored on the prerecorded content database 101.

Figure 5C:

FIG. 5C illustrates a real-time feed of a user from a video recorder 110 superimposed over a washed content, wherein the user image 520 is added onto the scene. In certain embodiments, the user can use an outline graphic to position himself in the scene. That is, the user can move into a position such that the user is generally within the position of the washed actor as indicated by the outline graphic 515. In some embodiments, the video compositor 120 automatically positions the feed from the video recorder 110 in a frame such that an outline graphic is unnecessary by using previously recorded actor position data to determine where the user image is placed.

Figure 5D:

FIG. 5D illustrates a frame from a completed combined video. The user 520 is inserted into the scene alongside the retained actor 510. In certain embodiments, the completed combined video is displayed on the display 125. The combined video can also be saved for future playback, or the combined video can be recreated from the washed scene and user content without saving the combined video.

Figure 6A:
FIGS. 6A-6B illustrate an exemplary matte layer created during the media content preparation process of FIG. 3.
Figure 6B:

FIGS. 6A and 6B illustrate an exemplary matte layer created during the media content preparation process of FIG. 3. In particular, FIG. 6A illustrates a matte layer created from the frame illustrated in FIG. 6B. In FIG. 6B, the flight attendant 620 is part of the foreground scene and appears in front of the passenger 630 selected for the washing process. In certain embodiments the matte creation can be performed by "tracing" the particular figure with a digital pointer, frame-by-frame, or using other software means available to track and/or trace the elements.

The resulting matte layer 610 can be either a moving or stationary video file used during playback of the washed content to delineate a foreground element of the original source content. Associating this matte with the real-time user image from the video recorder 110 essentially "blocks" the user's image where a foreground object, such as the flight attendant, covers the user image, and thereby creates the illusion that the user is positioned between background and foreground elements. By using a moving matte layer, the foreground element can be kept in front of the participant's image even when the foreground element moves, such as if the flight attendant moves in front of the user. The resulting composition advantageously creates a more realistic, multi-dimensional interactive experience.

In yet other embodiments of the invention, additional features can be employed with that utilize components of the interactive role performance system 100 hosted and/or deployed in an online environment. For instance, one method of hosting the content online allows a party or user to control the storage, filtering, and/or distribution of the finished video output. In certain embodiments of the technology, a new video file is generated with the combined image of the user and the prerecorded content. This "output" file could be saved for later playback, shared online, or sold as a DVD to the user in a variety of fashions. Though the output of the composition in a single, cohesive video stream is relatively efficient, certain problems also can arise with such an arrangement.

First, in spite of advanced video encryption techniques, users could find ways to copy and/or share their recorded files at will. Second, without control over the output content, it can be difficult to police or filter which output files could be shared online. Third, generating fully-integrated output files with each user experience can create redundancies in the storage process, increase hosting expenses, and/or decrease overall system capacity and/or efficiency.

To address these issues, certain systems and methods isolate the user's recorded performance from the prerecorded background throughout the entire process, such that the images are not combined, except visually during performance playback. In certain embodiments, the washed clip is not altered or re-recorded during a performance. Rather, the washed clip can be merely referenced again if a playback option is selected, then replayed in tandem with the user's overlay segment.

There are several additional or alternative ways that the video files can be protected in the disclosed interactive role performance systems. In one embodiment, the prerecorded background content and/or the recorded performance is stored in a non-standard video format such that it is unplayable in standard video formats or players. In some embodiments, the fact that the images are separate or the background content is an individual file is concealed. In certain embodiments, the background and/or user media files are stored separately on the user's local system.

Other content protection methods can also be used. One method is to lock each background content clip to a specific operating system, and/or render them non-transferable between systems. Another method is to make only the user file uploadable to a website for hosting and/or sharing, and render the background video unsharable. In some embodiments, an online system runs an auto query each time an offline system becomes web enabled in order to register the software operating system and/or lock the content to the that system. Another method is to use a dynamic URL for a website, and/or change it regularly. In some embodiments, the uploaded clips are digitally "watermarked" in order to track their use should they be found outside controlled channels. In one embodiment, combined content is stored only on a secure storage location, such as a controlled server, and only links or references to the protected content are allowed from programs or applets. The programs can stream the files from the secure storage location without saving a copy of the content. In some embodiments, the programs are authorized by the secure storage location before access to the protected content is allowed.

Furthermore, there are processes contemplated in which the user-generated content can be filtered in order to remove objectionable material. One approach is to establish nudity and/or profanity filters in the finished file upload process. During upload, each performance can be filtered in real time for nudity and/or profanity, and then assigned a numerical number based on its evaluation. Numbers below a certain benchmark can be manually reviewed by screeners, and/or numbers below a certain lower benchmark can be automatically rejected and discarded. Another way can be a complete manual review of the user generated content.

One advantage to utilizing the Internet or other network as a platform is the ability to engage multiple users from multiple remote locations with multiple cameras in numerous forms of interaction.

Figure 7:
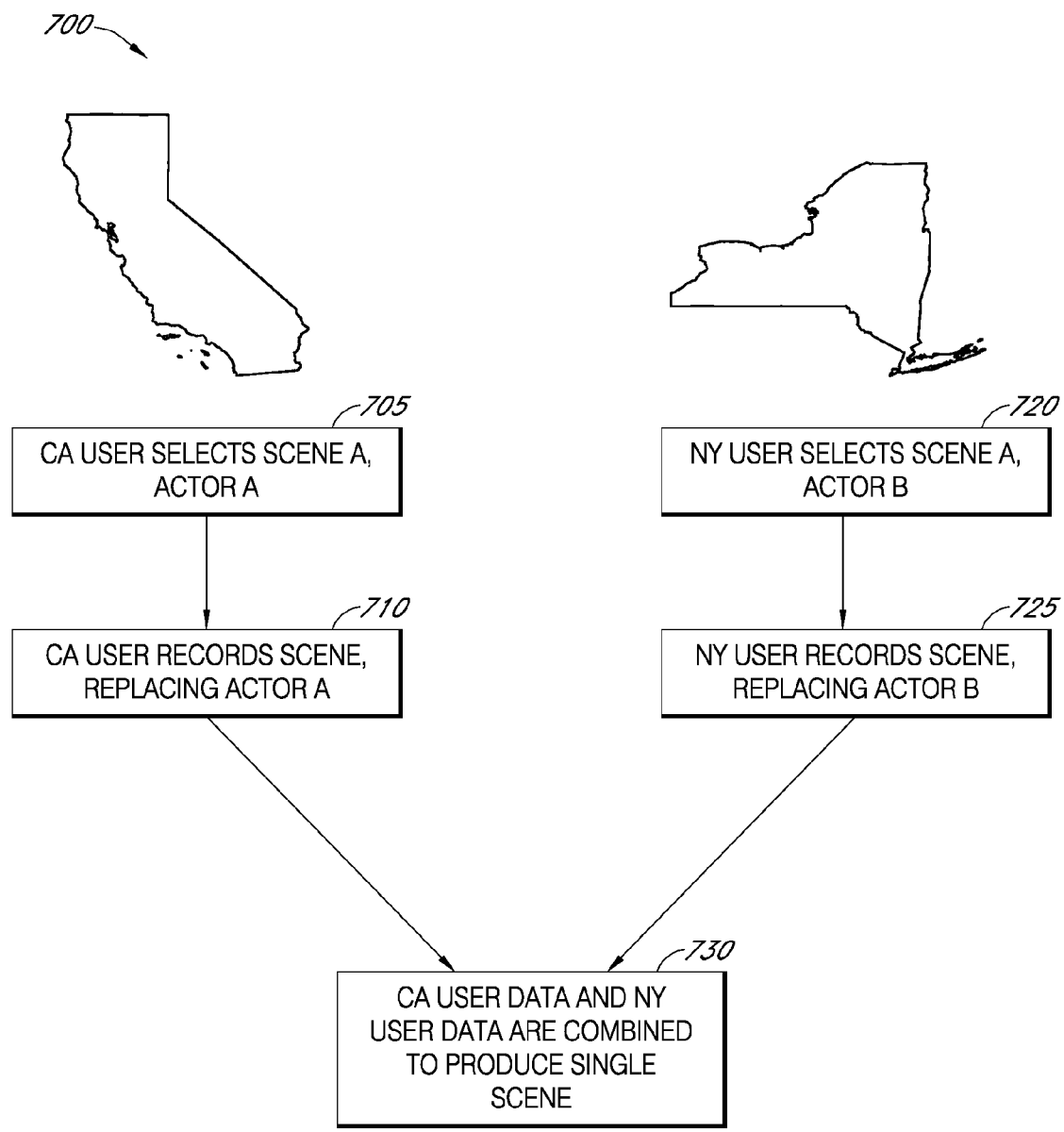
FIG. 7 illustrates an embodiment of a data flow diagram of an interactive role performance system configured to operate with multiple players in different geographic locations.

FIG. 7 illustrates an embodiment of a data flow diagram of an interactive role performance system configured to operate with multiple players in different geographic locations. For instance, a user in New York and a user in California can mutually or individually select a scene from STAR WARS to perform, such as with opposite roles. At Block 705, the California user selects the scene on his or her interactive role performance system. At Block 710, the California user selects the role of LUKE SKYWALKER for playing. At Block 720, the New York user selects the same scene on his or her interactive role performance system. At Block 725, the New York user chooses the role of DARTH VADER. When the players start the scene and play out the scene, the resulting composition is a single ensemble scene, even though the users are geographically distant. At Block 730, California user data and New York user data are combined to produce a single ensemble scene, wherein both participant images are combined in the same background scene.

Using an online platform, more complex media bundles and/or data files can also be quickly accessed and/or executed, making more intricate user experiences possible. The above multi-player effect, for instance, can require the use of additional background content bundles of completely washed scenes (see above), driven by data files or metadata which trigger the camera inputs from each respective user. The multi-camera use could also be executed such that a user in New York selects a previously performed clip posted by his friend in California, and decides to act opposite his friend after the fact.

In certain embodiments, this process can require controlled switching of the California clip (where the user performed as LUKE SKYWALKER) with a washed content prepared for DARTH VADER in order to constitute the background for the new, live user image streaming from New York. These multi-player scenes can thus either be performed live by both parties, or live by one party and prerecorded by the other party. They can also either play the opposite or the same character, and either replace characters or simply be inserted into the same scene. In some embodiments, there can be three or more users working together to create a single scene. Multi-camera, multi-location video games can also function well in this environment. It is understood that interactive role performance system can also be used for multiple players in the same location (e.g., participants in the same living room).

In certain embodiments, the online environment can be a website for sharing combined video and/or buying additional washed content. The website allows users to share their combined videos with other viewers. Users can rate videos, allowing videos to be ranked based on popularity. Videos can also be ranked based on number of views, age, and/or other selection criteria. Users can compete in contests using their performances. Users can choose to share videos with select individuals or can choose to make videos publicly available to anyone. Users can also build social networks with each other.

The website can comprise a home page which displays user information after the user logs in. User information can comprise messages, comments, invites, uploads, downloads, viewing statistics, and/or popularity of performances. The website can further comprise performance gallery pages where combined videos are displayed and where users may search for combined videos based on associated metadata. The website can further comprise store pages, where additional content may be purchased for the interactive role performance system 100. The purchased content can then be downloaded to the interactive role performance system 100.

In addition to allowing increased protection, filtering, efficiency, and/or multi-camera playability, the Internet offers several advantages. These comprise, but are not limited to, the ability to generate and monetize script print-outs, teleprompters and application text output for scripts and lyrics, the ability to generate a video introduction to be used to introduce emails and postings, the ability to select between output devices including various computer platforms, various multimedia and mobile devices, set-top boxes, and video gaming consoles, the ability to download clips with embedded data files, the ability to perform clips with the use of an online interface, the ability to upload files into a sharing forum, vote on clips, share comments, feedback and ranking information, and award prizes, the ability to select the sharing/playback information between private/public and limited/mass distribution options, the ability to select between output options and platforms, the ability to generate still frames and order customized products such as T-shirts containing the generated still frames, the ability to utilize 3D rendering and avatar elements to enhance the production value, the ability to use video and audio special effects either before, during, or after a performance, the ability to include animation of any kind, the ability to create or utilize video mash-ups, the ability to select additional levels of parental controls and content filtering, the ability to manipulate content through audio and video mixing tools, editing suites, mash-up controls, and the like, and/or the ability to record new content such as audio information to mix into the clips.

Figure 8:
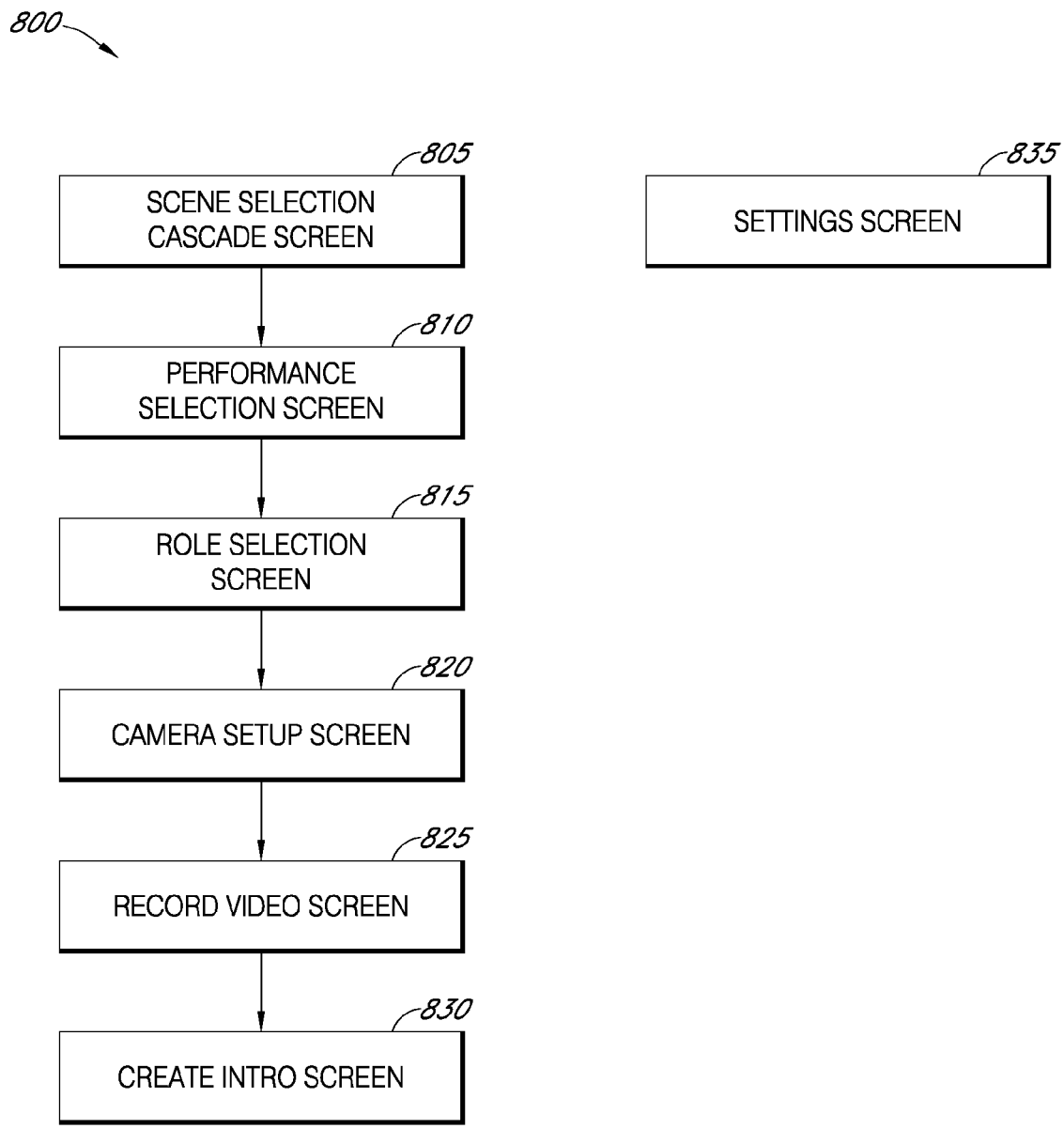
FIG. 8 illustrates an embodiment of a wireframe for a video compositing interface of the interactive role performance system of FIG. 1.

In certain embodiments, the interactive role performance system 100 provides a user interface for the user to control the video compositing process. FIG. 8 illustrates an embodiment of a wireframe 800 of various pages of a video compositing interface.

Figure 9:
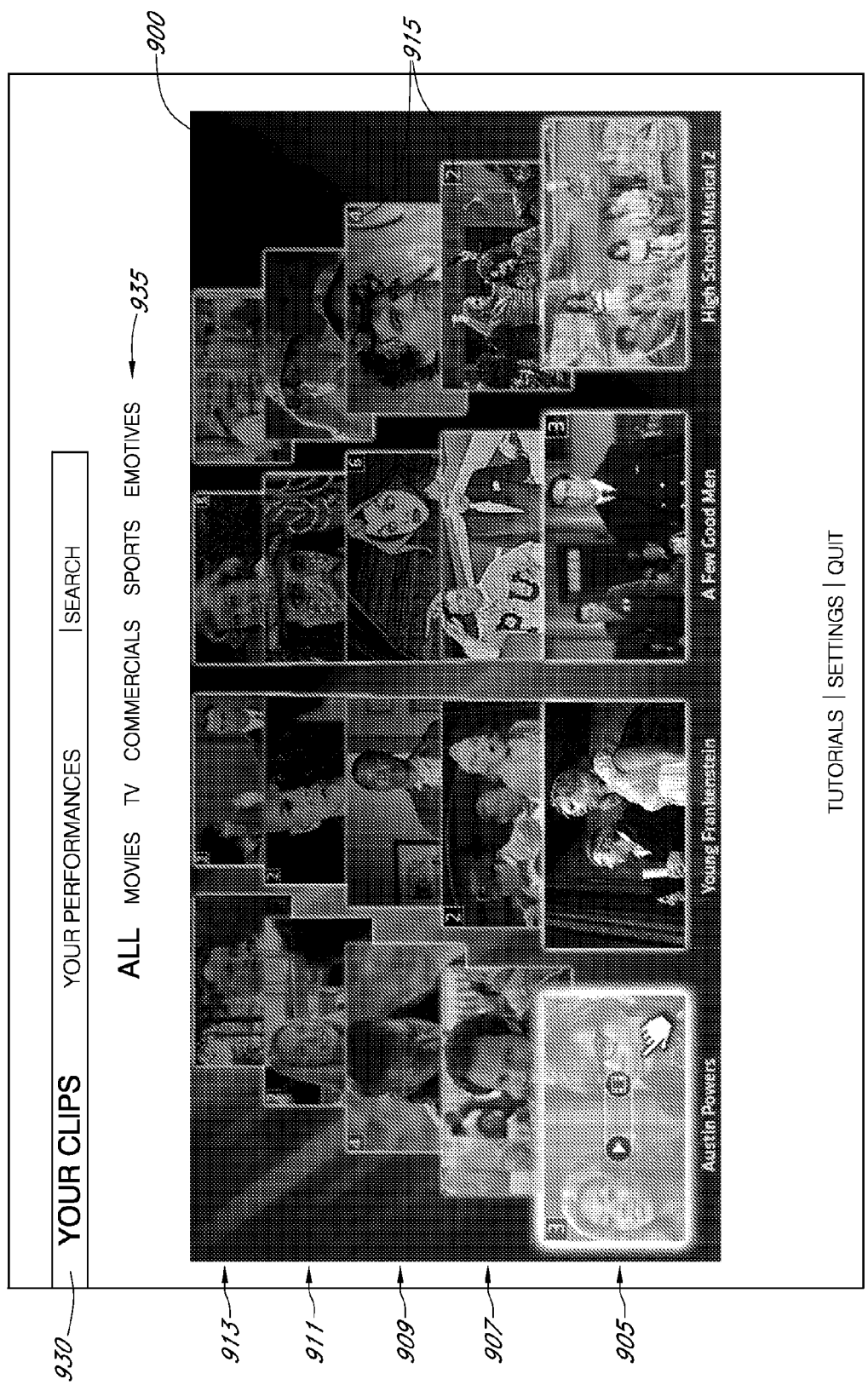
FIG. 9 illustrates an exemplary screen display of one embodiment of a cascade interface for a video compositing interface.

In certain embodiments, the interactive role performance system 100 provides a graphical user interface for the user to view and/or select washed scenes and/or combined video scenes. A cascade user interface can advantageously allow the user to view a plurality of scenes or data tiles on one screen (Block 805). In some embodiments, the cascade interface comprises a plurality of rows and columns of images of scenes. The scenes can be still or static images and/or video clips. FIG. 9 illustrates an exemplary screen display of one embodiment of the cascade interface.

As illustrated in FIG. 9, the display 900 includes four columns and five rows of screen or data tiles arranged in a three dimensional array. Each of the tiles further includes a graphical representation of the media content that it represents, such as still images of movies. The illustrated bottom, front or first row position 905, displays the "closest" scenes or screen tiles to the user. Close scenes can be denoted by a color image, unless the scene is from a black and white movie, larger size, and/or a title. Scenes on "farther" rows are progressively grayed out and/or smaller. The "closer" scenes partially overlay the subsequent "farther" scenes. Additional information can be superimposed on the image, such as the number of washed scenes, the run-time of scenes, the number of combined video created using washed scenes from the movie 915, and/or the like. Scene ordering can be contextual based. For example, the most recently selected scenes can appear on the first row position 905, with less used scenes displayed on progressively further rows.

In FIG. 9, the interface is "focused" on the first row of data tiles, that is, the selected scene is one from the first row. Keystrokes or other user controls can send a selection command to the interface that can move the focus from one selected scene to another on the first row. Focus can be shifted to another row by moving the cascade and selecting a new first row and/or by using a mouse to select a clip on another row.

In FIG. 9, up to 20 scenes can be displayed at one time. Other scenes are displayed by "rolling" or shifting the cascade. For example, the first row position 905 consists of scenes 1-4, the second row position 907 consists of 5-8 and so on until the fifth row position 913 of 17-20. Scenes above 20 are undisplayed. The user can use an input device, such as a keyboard, keypad, touch screen, mouse, remote, and/or the like to send a navigation command to the interface to roll down the cascade. The first row of data tiles can be rolled or shifted out of the current selection with the second row of scenes 5-8 appearing in the first or front row position 905. Subsequent rows move to "closer" row positions. A new fifth row with scenes 21-24 appears in the furthest, end or back row position 913.

In certain embodiments, the cascade can be rolled until the undisplayed scenes are sequentially displayed to the user. The cascade can stop rolling once the last scene is displayed or it can loop back to the initial first row, with scenes 1-4 appearing in the fifth row position 913 with the user able to keep rolling the cascade and repeating the display of the scenes. The cascade can also be rolled up, with new scenes appearing as the closest row 905 instead of the farthest or end row 913. It is understood that fewer or greater number of scenes can be displayed by using fewer or greater numbers of rows and/or columns. In certain embodiments, more than four columns can be displayed. In some embodiments, less than four columns can be displayed. In certain embodiments, more than five rows can be displayed. In some embodiments, fewer than five rows can be displayed. The number of rows and columns used can depend on the number of scenes to be displayed on a single screen.

In FIG. 9, filters can further be applied to the scenes such that only certain categories of scenes are displayed. In certain embodiments, selectable filters 930, 935 are displayed at the top of the cascade interface. Scenes can be filtered based on categories such as available movie clips, movie content ratings (e.g., "G," "PG," "R," etc.), and/or performances of combined videos. Scenes can also be filtered based on categories such as movies, TV, commercials sports, emotives, combinations of the above, or the like. A search bar can also allow the user to search for specific scenes. Searches can be based on actors, move titles, scene names, descriptions, and/or the like.

Figure 10:
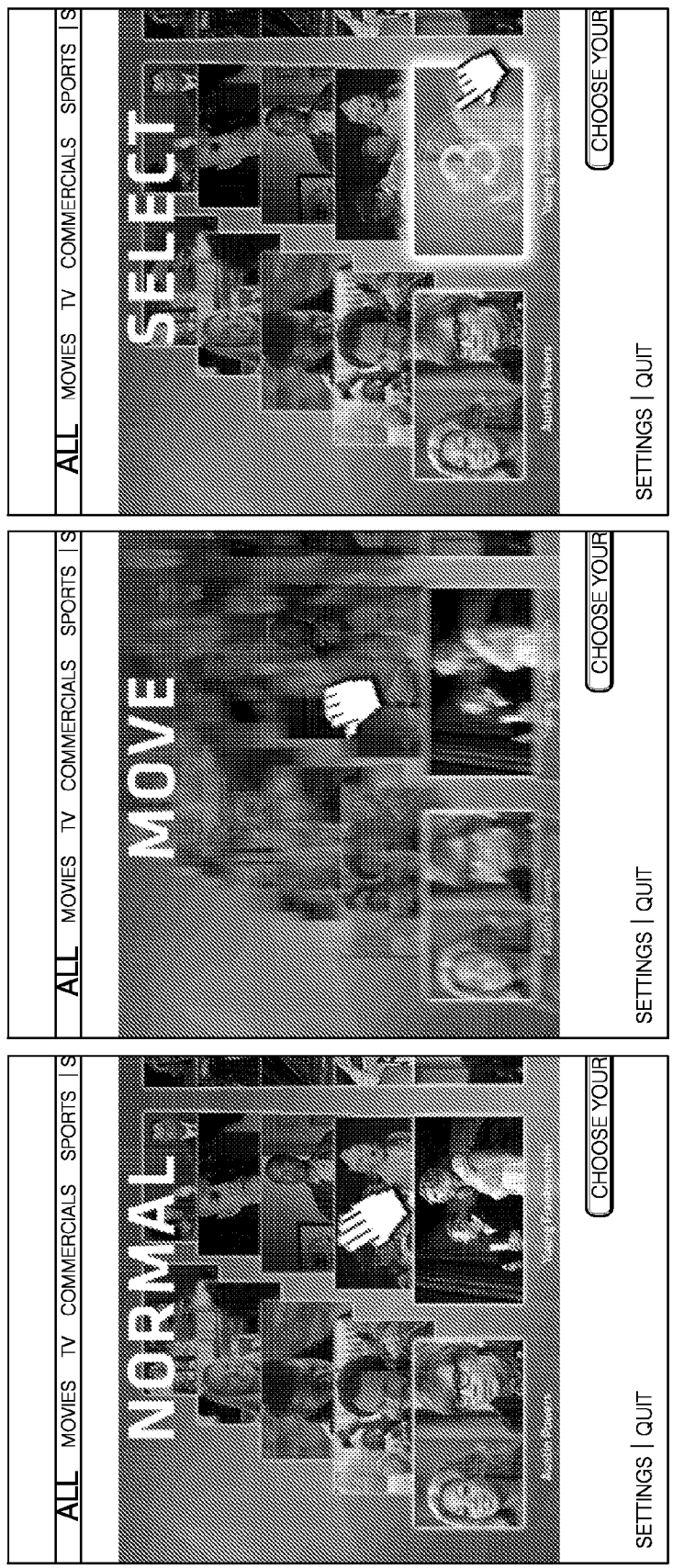
FIG. 10 illustrates an exemplary screen display of one embodiment of the movement and selection process of the cascade interface of FIG. 9.

FIG. 10 illustrates an exemplary screen display of one embodiment of the movement and selection process of the cascade interface of FIG. 9. The user can roll down the cascade, causing new images to be displayed. In certain embodiments, when the user holds down a button on the mouse while the mouse pointer is over the cascade, the mouse pointer changes to a gripping hand, indicating the user has grabbed the cascade and can now roll the cascade. Dragging up can roll the cascade up, while dragging down can roll the cascade down. The cascade can roll through multiple rows depending on how far the user moves the mouse. After the user finishes rolling the cascade, the displayed scenes appear in the normal cascade configuration of FIG. 9. The user can then select an image. It is understood that other input devices can be used to control the cascade, including, but not limited to, a keyboard, arrow keys, a mouse, a remote control, a touch pad, or the like.

A selected image can display a play icon so that the user can play the scene corresponding to the image. The select screen of FIG. 10 illustrates one embodiment where selection converts the image to a video clip so that the movie scene is played in the cascade. In some embodiments, hovering a cursor over the scene can cause the scene to automatically play. Selecting a scene can also cause the cascade interface to proceed to another screen, such as the performance screen at Block 810 in FIG. 8, which displays the washed content from the movie, and the selectable actors. Selecting a row and/or clip can also cause the cascade to "fold down" into a single row, with the further rows being folded into the first row simulating a stack of cards or a ROLODEX.

It will be recognized that the cascade can operate in various manners and is not limited to displaying scenes. For example, the cascade could display the closest images in the top row instead of the bottom row. The cascade could be rolled horizontally instead of vertically. The user could use a keyboard, touch screen, keypad and/or remote to move the cascade. The user could select the number of rows and columns that make up the cascade. The user could re-order the images by moving images into different positions. Closer and farther images could be indicated using other visual cues or no cues could be used. The cascade could be used to display titles, DVD covers, album covers, photographs, icons, and/or other images.

Figure 11:
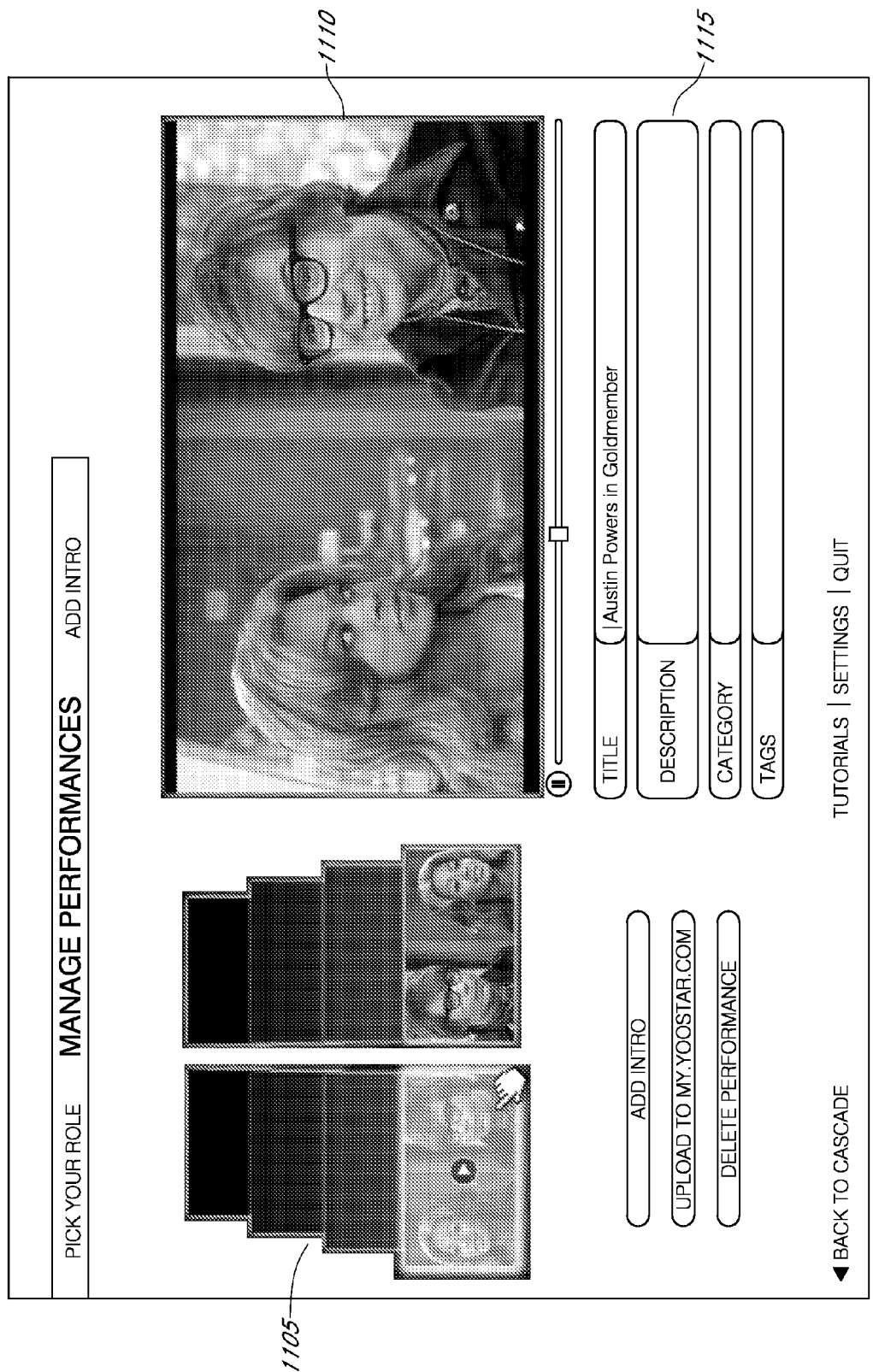
FIG. 11 illustrates an exemplary screen display of one embodiment of a performance screen of a video compositing interface.

Referring back to FIG. 8, after an image in the cascade is selected, the wireframe 800 moves to Block 810, where a scene to be performed can be selected. FIG. 11 illustrates an exemplary screen display of one embodiment of the performance screen. A cascade interface 1105 displays the available washed content from the selected movie. The cascade interface 1105 of FIG. 11 can behave similarly to the cascade interfaces of FIGS. 9 and 10. A large display window 1110 can display the washed content scene in a higher resolution. Scene information 1115 associated with the washed content can also be displayed, and may comprise, for example, editable title, description, category, and/or tags associated with the washed content.

Figure 12:
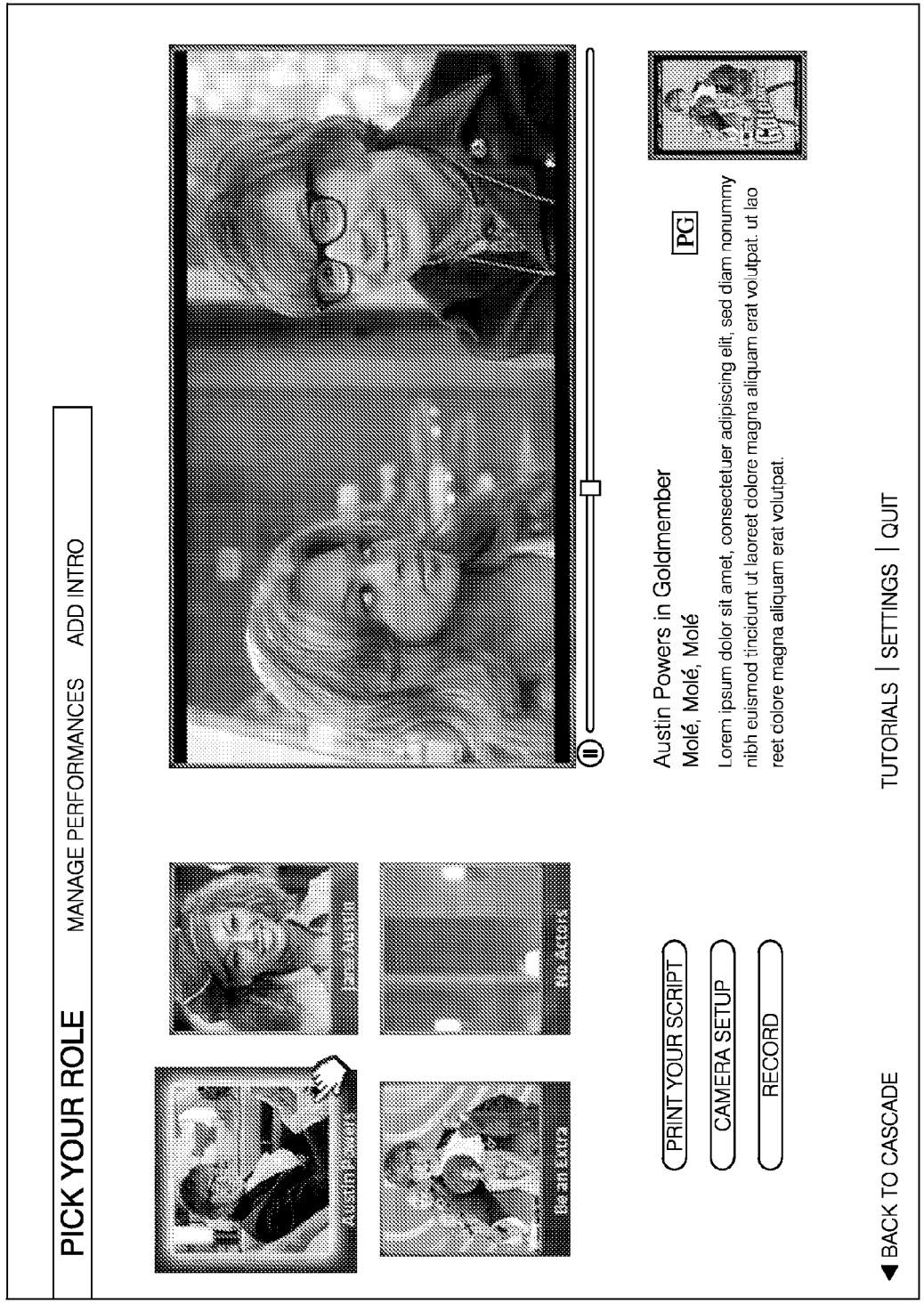
FIG. 12 illustrates an exemplary screen display of one embodiment of the role selection screen of a video compositing interface.

After a performance is selected, the wireframe 800 proceeds to a role selection screen at Block 815. The role selection screen allows a user to select an actor to play, to be added in the scene as an extra, and/or to select a completely washed clip where no actors are left. FIG. 12 illustrates one embodiment of the role selection screen.

Figure 13:
FIG. 13 illustrates an exemplary screen display of one embodiment of a large screen view of a display window of a video compositing interface.

Moreover, in certain embodiments, the user can choose to display a larger view of the display window when viewing a scene. FIG. 13 illustrates one embodiment of a large screen view of the display window.

Figure 14:
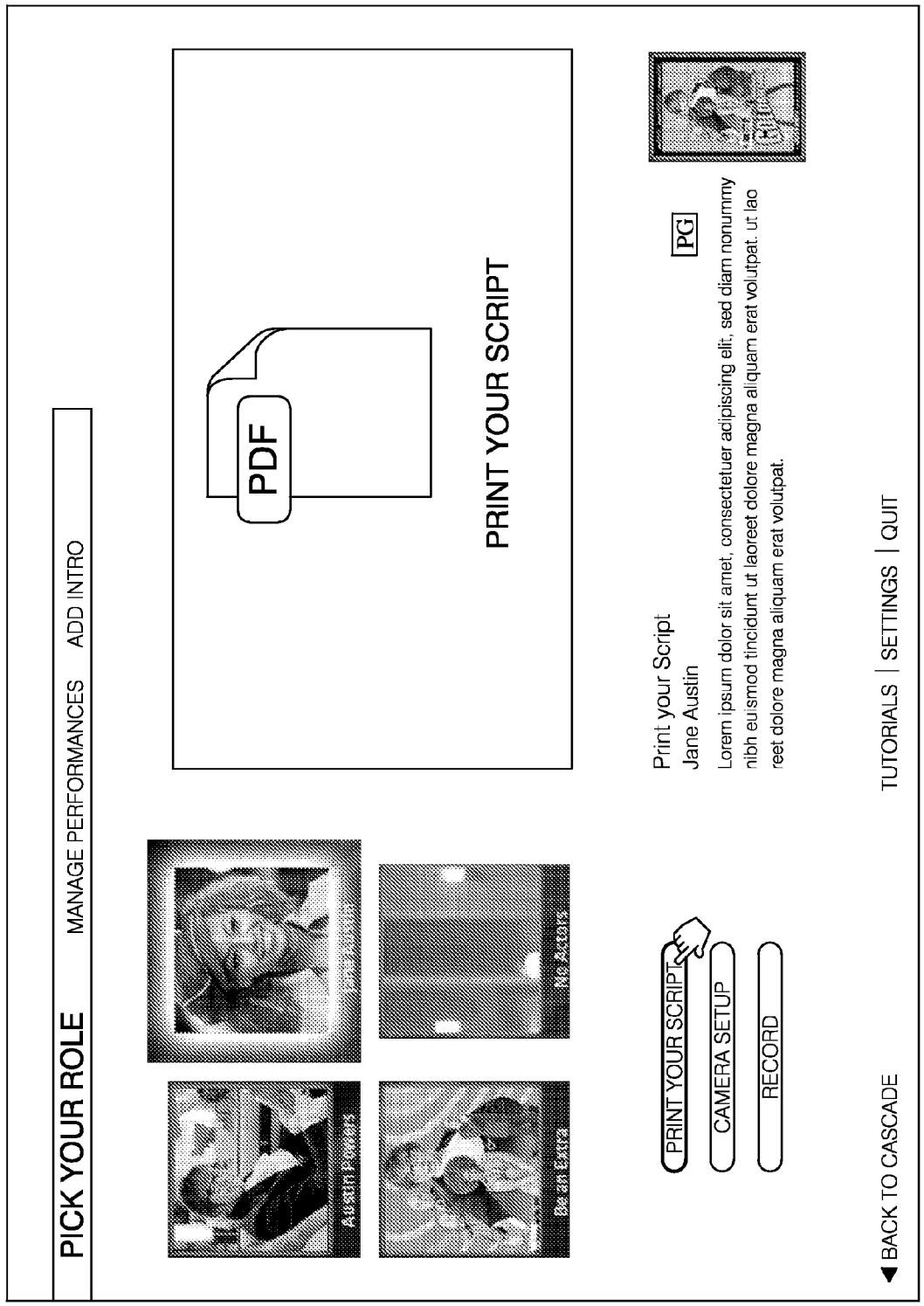
FIG. 14 illustrates an exemplary screen display of one embodiment of a script printing screen of a video compositing interface.

After selecting a role, the user can print out a script of the lines in the scene. FIG. 14 illustrates an exemplary screen display of one embodiment of a script printing screen. In certain embodiments, the script can be provided as a PDF, text, Word document, image, and/or other file type.

Figure 15:
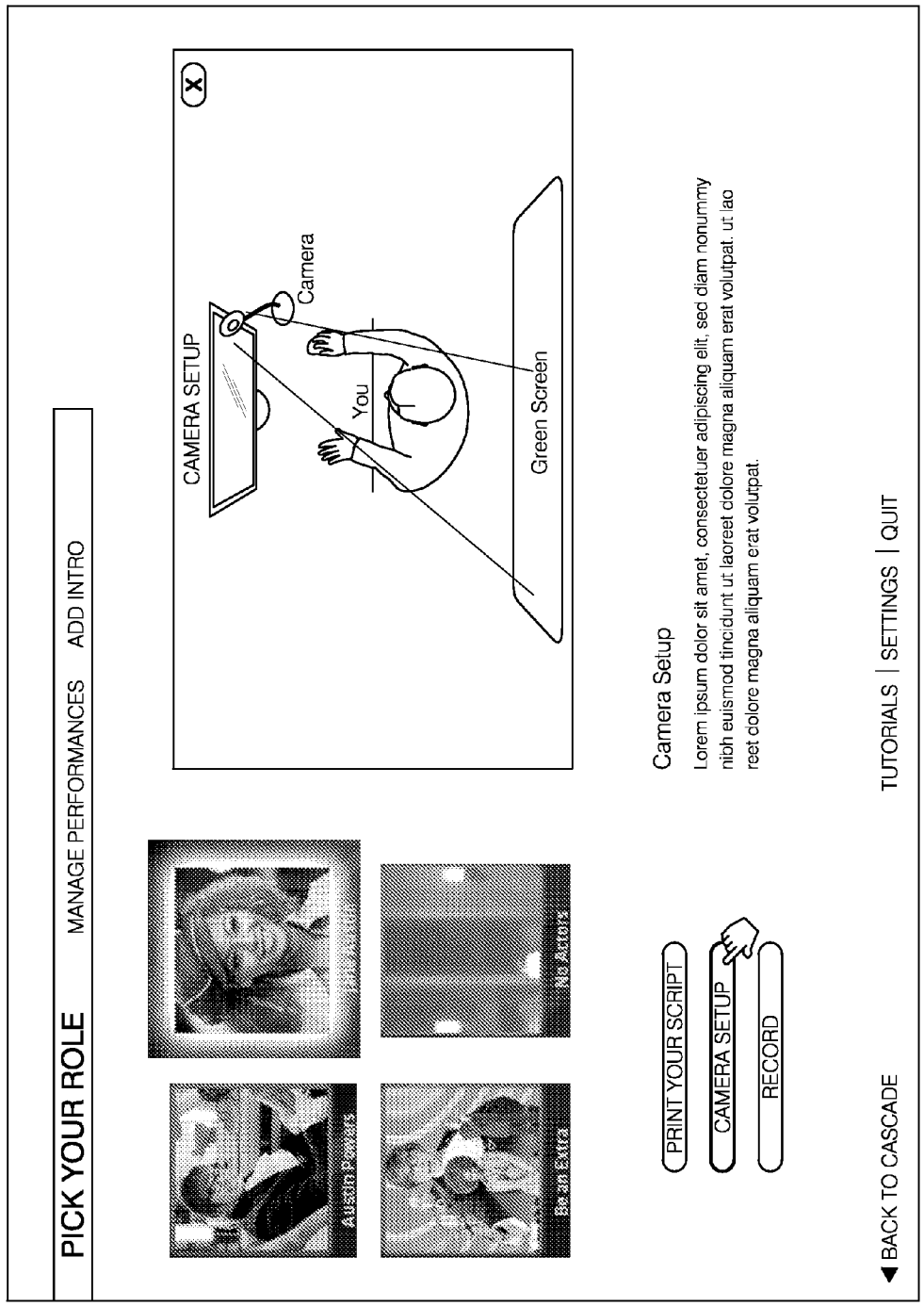
FIG. 15 illustrates an exemplary screen display of one embodiment of the camera setup screen of a video compositing interface.
Figure 16:
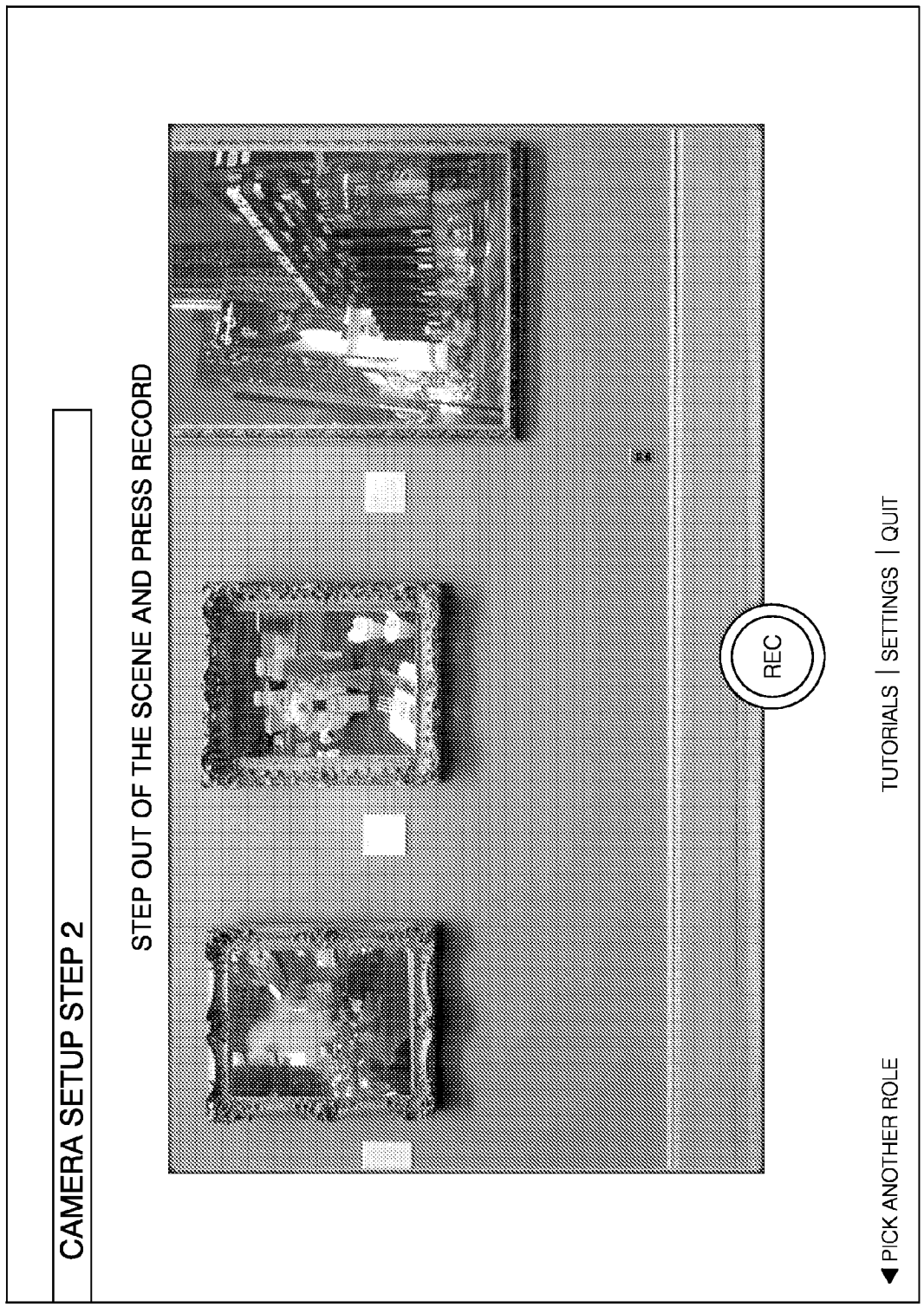
FIG. 16 illustrates an exemplary screen display of one embodiment of a reference frame setup screen of a video compositing interface.

Referring back to FIG. 8, at Block 820, the user is instructed on how to setup the camera. FIG. 15 illustrates an exemplary screen display of one embodiment of the camera setup screen. The instructions can comprise positioning information of the user relative to the camera, green screen and/or monitor. Before recording can proceed, the camera can capture a reference frame of the scene. FIG. 16 illustrates an exemplary screen display of one embodiment of the reference frame setup. The user can be instructed to step out of the scene and press record to capture a reference frame of the background. In certain embodiments, the camera auto focus and/or white exposure may be turned off to get a more consistent background image.

At Block 825, the wireframe 800 moves to a record video screen, wherein the participant records a video of himself or herself to be combined with the washed content. For instance, the video combining process can be include the compositing process 200 described above with reference to FIG. 2. In some embodiments, another role can be selected, allowing one participant to play multiple roles or more than one participant to play roles in the same scene.

Figure 17:
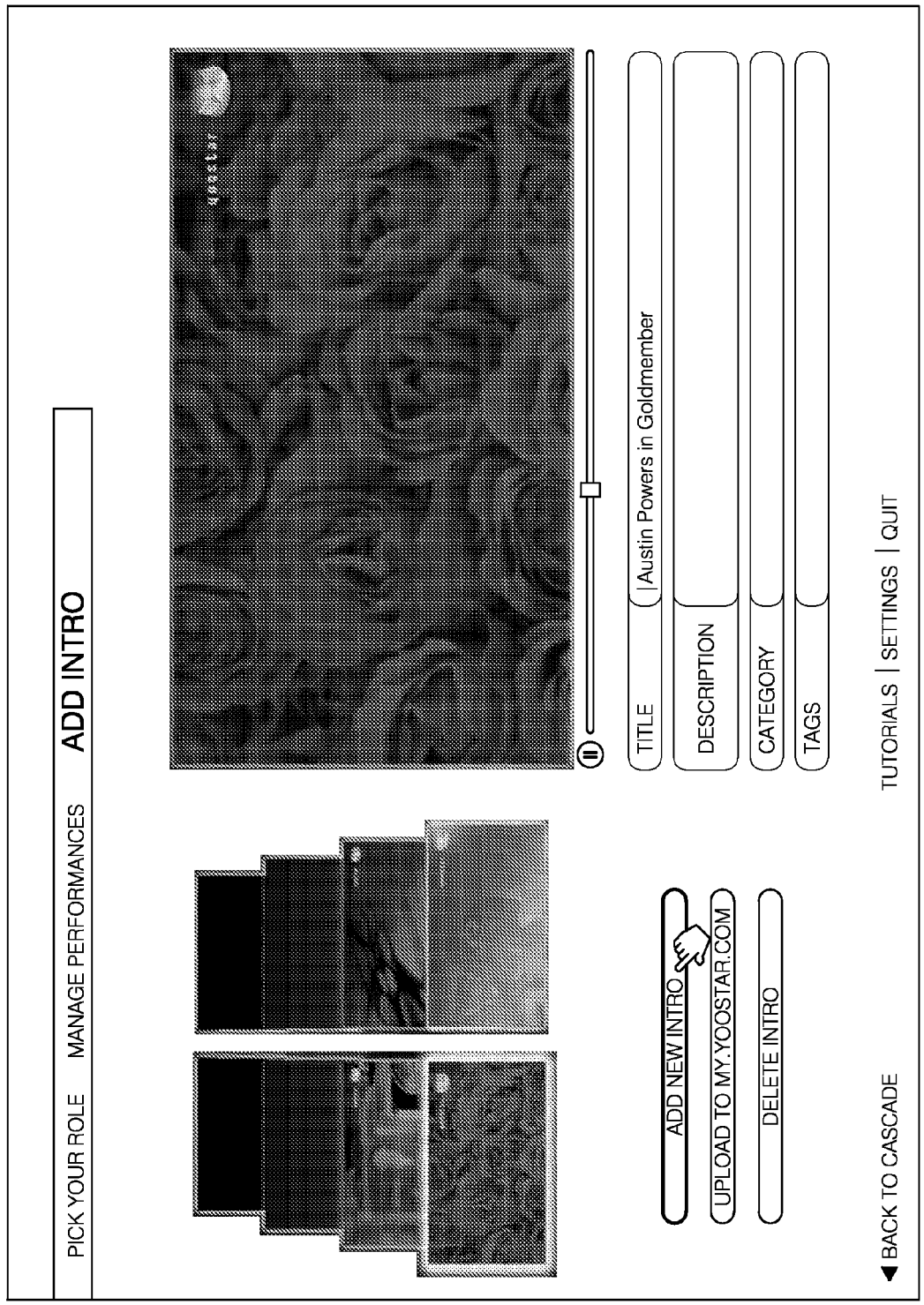
FIG. 17 illustrates an exemplary screen display of one embodiment of an add introduction screen of a video compositing interface.

At Block 830, the user can add an introduction for the combined video. FIG. 17 illustrates an exemplary screen display of one embodiment of an add introduction screen. In certain embodiments, a cascade displays available backgrounds. The background can be a message, advertisement, product placement, logo, still image, combinations of the above, or the like. A display window shows a larger image of the selected background. The user can record an introduction using a process similar to the video compositing process 200 described in FIG. 2. The user can add metadata to the introduction, such as title, description, category, and/or tags. Once the combined video is complete, the user can upload the video to a central storage for sharing, such as a website.

Figure 18:
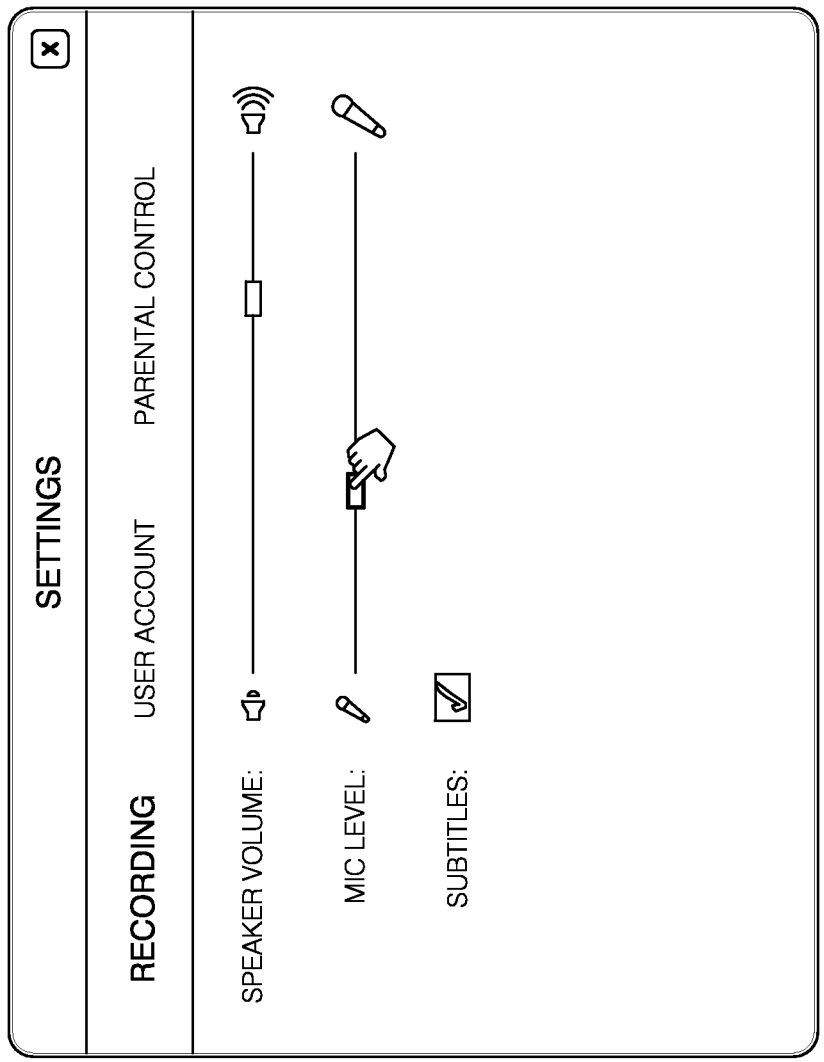
FIGS. 18-20 illustrate exemplary screen displays of one embodiment of the setting screens of a video compositing interface.
Figure 19:
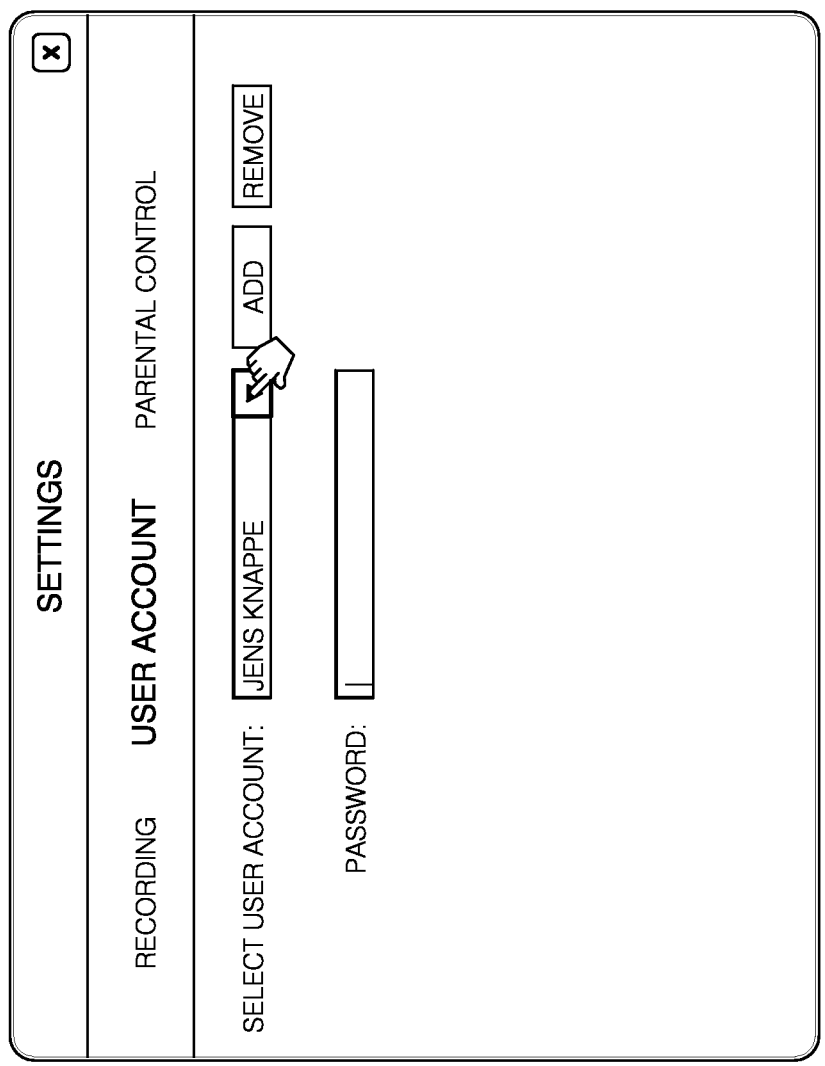
Figure 20:
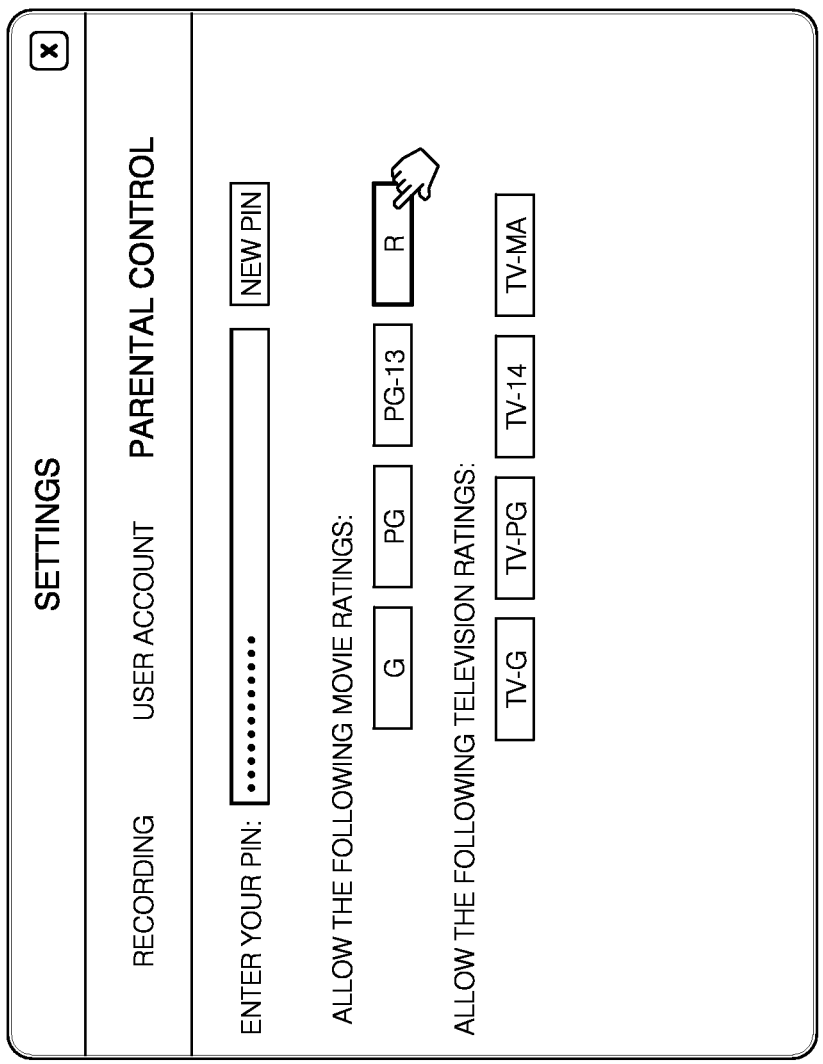

The user can access the settings screen, at Block 835, from many of the interface screens. FIGS. 18-20 illustrate exemplary screen displays of one embodiment of the setting screens. The user can determine recording settings, user account settings, and/or parental control settings.

It should be noted that the above developments would accompany any embodiment of the system, whether as a stand-alone hardware device for the living room, a computer-based system of any platform, on video game systems of any video game platform, any mobile technology, any public venue system or kiosk, or any other foreseeable embodiment.

In certain embodiments, the interactive role performance system 100 can be provided in a self-contained, mobile unit. The mobile unit can be a movable kiosk, an automobile, and/or a portable device. The mobile units can be set up at college campuses, high schools, movie theaters, retailers and/or other public venues. Users can use the mobile units to create performances without having to purchase their own system.

In some embodiments, the interactive role performance system 100 is provided in a mobile device, such as a laptop, PDA, cell phone, smart phone, or the like. The mobile device can be used to view, preview, and/or record media content. In some embodiments, the mobile device is connected to an online content database from which the mobile device can upload participant performances and download washed content and other users' performances.

In certain embodiments, the interactive role performance system 100 can be provided as a package comprising of a green screen, a stand for the screen, a USB camera, a camera hook or clip, a remote, a tripod, and/or a CD or DVD containing software implementing the functions of the interactive role performance system and a number of prerecorded content. Moreover, systems and methods disclosed herein can be advantageously used with the video compositing systems and method disclosed in U.S. Pat. No. 7,528,890, issued May 5, 2009, which is hereby incorporated herein by reference to be considered part of this specification.

In some embodiments, the interactive role performance system 100 can be used in a gaming system. For example, a gamer can use the interactive role performance system 100 to record his actions and insert it into a game. The game could be a music video game where the gamer is playing a musical instrument. The gamer's image could be recorded and inserted into the game as a band member playing a song onstage. The gamer could also be inserted into a music video for the song that the gamer is playing. The interactive role performance system 100 can be used in other types of games, such as a movie making game, a fighting game, and/or a role playing game.

Similarly, the system can be used in a variety of markets or distribution channels, such as education, airlines, prisons, or for gaming, dating, corporate training, education, professional services, and/or entertainment use, in either the U.S. or internationally. It can be used for advertising or promotions, product placement, viral marketing, on-line sharing, contests, surveys, consumer products, affiliate programs, clothing and apparel, still photographs, avatars, greeting cards, mash-ups, hardware, software, or licensing.

The content may be, but is not limited to film, television, music, music videos, documentaries, news, sports, video games, original content, user-generated content, licensed content, royalty free content, any pre-existing moving image or graphic content, still images, digital avatars, and/or online content. For example, a user can replace a sports commentator in a sports clip and provide alternate commentary, giving his own analysis and/or opinion of the game. The content may or may not include audio, dialogue, and/or effects. The content can be in English or any other language.

The user experience might include, but would not be limited to, a keyboard, mouse, manual, or remote user interface, the use of a wired or wireless webcam, camera positioning via manual or digital means, sound recording by means of one or more wired, wireless, or built-in microphones, accessories such as props, costumes, a colored green screen with or without a stand, no green screen, coin-operated kiosks with or without an operator or operators, automated interface navigation with manual or automatic data entry, automated demos, tutorials, and explanations, any type of compositing—with or without a chroma key, and/or any type of output on any platform.

Furthermore, in certain embodiments, the systems and methods described herein can advantageously be implemented using computer software, hardware, firmware, or any combination of software, hardware, and firmware. In one embodiment, the system is implemented as a number of software modules that comprise computer executable code for performing the functions described herein. In certain embodiments, the computer-executable code is executed on one or more general purpose computers. However, a skilled artisan will appreciate, in light of this disclosure, that any module that can be implemented using software to be executed on a general purpose computer can also be implemented using a different combination of hardware, software or firmware. For example, such a module can be implemented completely in hardware using a combination of integrated circuits. Alternatively or additionally, such a module can be implemented completely or partially using specialized computers designed to perform the particular functions described herein rather than by general purpose computers.

Moreover, certain embodiments of the invention are described with reference to methods, apparatus (systems) and computer program products that can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the acts specified herein to transform data from a first state to a second state.

These computer program instructions can be stored in a computer-readable memory that can direct a computer or other programmable data processing apparatus to operate in a particular manner, such that the instructions stored in the computer-readable memory produce an article of manufacture including instruction means which implement the acts specified herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the acts specified herein.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for combining video signals in an interactive video system, the method comprising:
   receiving a first video signal associated with pre-washed video content, the pre-washed video content having been created from prerecorded video content having multiple frames by digitally removing an original character therefrom in selected ones of the multiple frames;
   receiving metadata associated with the first video signal, the metadata being indicative of the selected frames;
   receiving a second video signal in real-time comprising second video content having a background image and a video image of a participant playing a role of the original character in front of the background image;
   filtering the second video signal in real-time to remove the background image to create a modified second video signal with the video image of the participant; and
   overlaying in real-time the first video signal and, as determined by the metadata, the modified second video signal corresponding to the selected frames to create a combined video signal, whereby the video image of the participant in the selected frames appears in place of the original character of the prerecorded video content.

2. The method of claim 1, additionally comprising displaying the combined video signal in real time with respect to said receiving the second video signal.

3. The method of claim 1, wherein said filtering comprises:
   receiving a third signal consisting essentially of the background image;
   comparing the second video signal with the third signal to identify matching portions of the second video signal and the third signal; and
   modifying the second video signal by designating the matching portions within the second video signal to be transparent.

4. The method of claim 1, wherein the prerecorded video content comprises a portion of at least one of a movie, a television show, and a commercial.

5. The method of claim 1, wherein the prerecorded video content comprises a still image.

6. The method of claim 1, wherein said receiving the first video signal comprises receiving the first video signal via a network.

7. The method of claim 1, additionally comprising displaying a script to the participant during said receiving the second video signal, wherein the script corresponds to lines of the original character.

8. The method of claim 1, additionally comprising storing the modified second video signal separate from the first video signal for later overlaying and displaying.

9. The method of claim 8, wherein said storing comprises uploading the modified second video signal onto a network.

10. The method of claim 1, wherein in the pre-washed video content, a second original character has been digitally removed from the prerecorded video content in a second selected ones of the multiple frames, additionally comprising:
    receiving second metadata indicative of the second selected frames;
    receiving a third video signal comprising a second video image of a second participant; and
    overlaying the first video signal and, as determined by the second metadata, the third video signal corresponding to the second selected frames, whereby the second video image of the second participant in the second selected frames appears in place of the second original character of the prerecorded video content.

11. The method of claim 1, wherein said overlaying further comprises placing one or more elements of the prerecorded video content delineated by a matte layer in a foreground of the combined video content to overlay at least a portion of the video image of the participant.

12. The method of claim 1, wherein in the selected frames of the pre-washed video content, the original character has been digitally replaced with the background imagery surrounding the original character in the prerecorded video content.

13. The method of claim 1,
    wherein the participant steps away from a video camera to enable the video camera to record a reference background image, and the participant then steps back in for generating the second video signal.

14. The method of claim 13,
    wherein, prior to the participant stepping away from the video camera, the video camera records a reference image of the participant in front of the background image.

15. The method of claim 13,
    wherein the filtering step includes setting each pixel of the background image as transparent or opaque, based on a color channel difference between the second video signal and the reference background image for the pixel.

16. The method of claim 1,
    wherein the filtering step includes setting each pixel of the background image as transparent or opaque, based on a color channel difference between the second video signal and a reference background image for the pixel.

17. The method of claim 16, wherein the participant steps away from a video camera to permit the video camera to record the reference background image.

18. A system for interactive video entertainment, the system comprising:
- a first database comprising, pre-washed video content having been created from prerecorded video content having multiple frames by digitally removing an original character therefrom in selected ones of the multiple frames, and metadata associated with the pre-washed video content, the metadata identifying the selected frames;
- a video input configured to receive a real-time video signal comprising a video image of a participant and a background image; and
- a processing module configured to execute on a computing device, the processing module configured to, filter in real-time the real-time video signal to remove the background image to create a modified real-time video signal, and overlay in real-time, based at least on the metadata, a first video signal created from the pre-washed video content and the modified real-time video signal corresponding to the selected frames to create combined video signal, whereby the video image of the participant in the selected frames appears in place of the original character of the prerecorded video content.

19. The system of claim 18, further comprising a video recorder configured to generate the real-time video signal and to transmit the real-time video signal to the video input.

20. The system of claim 19, wherein the video recorder comprises a webcam.

21. The system of claim 18, wherein the processing module is further configured to cause a display of the combined video signal.

22. The system of claim 18, wherein the processing module is further configured to cause a display of a character outline at a location where the original character was digitally removed from the prerecorded video content.

23. The system of claim 18, further comprising a second database configured to store second video content based only on the modified real-time video signal.

24. The system of claim 18, wherein the processing module comprises a graphics processing unit (GPU).

25. The system of claim 18, wherein in the selected frames of the pre-washed video content, the original character has been digitally replaced with the background imagery surrounding the original character in the prerecorded video content.

26. A system for combining video signals, the system comprising:
- a first receiver for receiving a first video signal associated with pre-washed video content, the pre-washed video content having been created from prerecorded video content having multiple frames by digitally removing an original character therefrom in selected ones of the multiple frames, and for receiving metadata associated with the first video signal, the metadata being indicative of the selected frames;
- a second receiver for receiving a second video signal in real-time comprising a video image of a participant and a background image;
- a filter for filtering the second video signal in real-time to remove the background image and to create a modified second video signal; and
- a video compositor for overlaying in real-time, based at least on said metadata, the first video signal and the modified second video signal corresponding to the selected frames to create a combined video signal, whereby the video image of the participant in the selected frames appears in place of the original character of the prerecorded video content.

27. The system of claim 26, further comprising a display for displaying in real time the combined video signal.

28. The system of claim 26, wherein in the selected frames of the pre-washed video content, the original character has been digitally replaced with the background imagery surrounding the original character in the prerecorded video content.

29. The system of claim 26,
wherein the participant steps away from a video camera to permit the video camera to record a reference background image, and then the participant steps back in for generating the second video signal.

30. The system of claim 29, wherein, prior to the participant stepping away from the video camera, the video camera records a reference image of the participant in front of the background image.

31. The system of claim 29,
wherein the filtering includes setting each pixel of the background image as transparent or opaque, based on a color channel difference between the second video signal and the reference background image for the pixel.

32. The system of claim 26,
wherein the filtering includes setting each pixel of the background image as transparent or opaque, based on a color channel difference between the second video signal and a reference background image for the pixel.

33. The system of claim 32, wherein the participant steps away from a video camera to permit the video camera to record the reference background image.

34. The system of claim 26, wherein said overlaying further comprises placing one or more elements of the prerecorded video content delineated by a matte layer in a foreground of the combined video content to overlay at least a portion of the video image of the participant.

* * * * *